(12) United States Patent
Smaidris

(10) Patent No.: US 8,983,667 B2
(45) Date of Patent: Mar. 17, 2015

(54) FLUID FLOW MANAGEMENT THROUGH A WASTEWATER LEVEL MANIPULATION SYSTEM AND ASSOCIATED METHODS

(71) Applicant: Data Flow Systems, Inc., Melbourne, FL (US)

(72) Inventor: Thomas F. Smaidris, Melbourne, FL (US)

(73) Assignee: Data Flow Systems, Inc., Melbourne, FL (US)

( * ) Notice: Subject to any disclaimer, the term of this patent is extended or adjusted under 35 U.S.C. 154(b) by 0 days.

(21) Appl. No.: 14/063,569

(22) Filed: Oct. 25, 2013

(65) Prior Publication Data
US 2014/0048156 A1 Feb. 20, 2014

Related U.S. Application Data

(63) Continuation-in-part of application No. 13/372,778, filed on Feb. 14, 2012, now Pat. No. 8,600,568, which is a continuation-in-part of application No. 11/958,430, filed on Dec. 18, 2007, now Pat. No. 8,594,851.

(60) Provisional application No. 60/870,862, filed on Dec. 20, 2006.

(51) Int. Cl.
*F04F 3/00* (2006.01)
*F17D 3/00* (2006.01)
(Continued)

(52) U.S. Cl.
CPC .............. *C02F 1/006* (2013.01); *C02F 1/008* (2013.01); *C02F 3/006* (2013.01);
(Continued)

(58) Field of Classification Search
None
See application file for complete search history.

(56) References Cited

U.S. PATENT DOCUMENTS 3,703,960 A 11/1972 Kennedy
3,716,139 A 2/1973 Turner
(Continued)

OTHER PUBLICATIONS

Pumps & Motors, Public Works 127, n5 (Apr. 15, 1996), 12 pages.*
(Continued)

*Primary Examiner* — Robert Fennema
*Assistant Examiner* — Thomas Stevens
(74) *Attorney, Agent, or Firm* — Mark R. Malek; Widerman Malek, PL

(57) ABSTRACT

A system is provided to control fluid flow in a wastewater treatment system through wastewater level manipulation. The wastewater treatment system may include a wastewater treatment plant connected to a plurality of pump stations by a main. Each of the plurality of pump stations may include a wet well with a pump therein. The system may include a central server in communication with a sensor to sense a level of wastewater within the wet well. The pump may be automatically moved to an on position when the level of the wastewater in the wet well is at or above a first level and may be automatically moved to an off position when the level of the wastewater in the respective wet well is at or below a pump cutoff level. The central server may systematically manipulate the first level to selectively set the level of wastewater within the wet well.

22 Claims, 27 Drawing Sheets

(51) Int. Cl.
| | |
|---|---|
| G05D 11/00 | (2006.01) |
| G08B 21/00 | (2006.01) |
| G05D 7/00 | (2006.01) |
| C02F 1/00 | (2006.01) |
| C02F 3/00 | (2006.01) |

(52) U.S. Cl.
CPC ...... *C02F 2209/008* (2013.01); *C02F 2209/42* (2013.01); *C02F 2209/44* (2013.01); *C02F 2209/006* (2013.01); *C02F 2209/40* (2013.01)
USPC .................. 700/282; 137/2; 137/88; 137/94; 137/101.19; 137/115.02; 137/115.03; 340/606; 340/612; 340/613; 340/614; 340/615; 340/616; 340/617; 340/618; 340/619; 417/121; 417/122; 417/123; 417/124; 417/125; 417/126; 417/127; 417/128; 417/129; 417/130; 417/131; 417/132; 417/133; 417/134; 417/135; 417/136; 417/137; 417/138; 417/139

(56) References Cited

U.S. PATENT DOCUMENTS

| | | | |
|---|---|---|---|
| 3,760,946 A | 9/1973 | Boler | |
| 3,776,252 A | 12/1973 | Wilcox | |
| 3,839,198 A | 10/1974 | Shelef | |
| 3,844,946 A | 10/1974 | Farrell, Jr. | |
| 3,853,764 A | 12/1974 | Armstrong | |
| 3,886,065 A * | 5/1975 | Kappe et al. | 210/620 |
| 3,901,807 A | 8/1975 | Trump | |
| 3,920,550 A | 11/1975 | Farrell et al. | |
| 3,925,206 A | 12/1975 | Dea | |
| 3,937,596 A | 2/1976 | Braidwood | |
| 4,025,237 A | 5/1977 | French | |
| 4,036,754 A | 7/1977 | Peasley | |
| 4,049,013 A | 9/1977 | Shenk | |
| 4,122,013 A | 10/1978 | Greenleaf et al. | |
| 4,125,093 A | 11/1978 | Platzer, Jr. | |
| 4,193,869 A | 3/1980 | Brucker et al. | |
| 4,243,522 A * | 1/1981 | Ter-Borch et al. | 210/774 |
| 4,341,504 A | 7/1982 | Hignutt et al. | |
| 4,387,020 A | 6/1983 | Hill | |
| 4,487,699 A | 12/1984 | Long, Jr. | |
| 4,526,188 A | 7/1985 | Olsson et al. | |
| 4,582,612 A | 4/1986 | Long, Jr. | |
| 4,622,134 A | 11/1986 | Kobayashi | |
| 4,675,116 A | 6/1987 | Hoyland | |
| 4,716,536 A | 12/1987 | Blanchard | |
| 4,801,246 A | 1/1989 | Baumberg | |
| 4,818,392 A | 4/1989 | Werner et al. | |
| 4,821,580 A | 4/1989 | Jorritsma | |
| 4,913,180 A | 4/1990 | Anderson, Jr. | |
| 4,925,564 A * | 5/1990 | Francis | 210/608 |
| 4,944,886 A | 7/1990 | Masri | |
| 4,976,863 A * | 12/1990 | Stearns | 210/608 |
| 5,021,161 A | 6/1991 | Calltharp | |
| 5,027,661 A | 7/1991 | Desaulniers et al. | |
| 5,039,404 A | 8/1991 | Norcross | |
| 5,045,202 A * | 9/1991 | Stearns et al. | 210/628 |
| 5,063,505 A * | 11/1991 | Pate et al. | 700/90 |
| 5,076,767 A | 12/1991 | Desaulniers et al. | |
| 5,128,029 A | 7/1992 | Herrmann | |
| 5,135,361 A | 8/1992 | Dion | |
| 5,190,442 A | 3/1993 | Jorritsma | |
| 5,228,996 A * | 7/1993 | Lansdell | 210/605 |
| 5,275,735 A * | 1/1994 | Stearns | 210/628 |
| 5,322,387 A * | 6/1994 | Heine et al. | 405/36 |
| 5,348,650 A | 9/1994 | Cummings, Jr. | |
| 5,360,556 A | 11/1994 | Ball et al. | |
| 5,540,555 A | 7/1996 | Corso et al. | |
| 5,591,010 A | 1/1997 | Van Zyl | |
| 5,597,960 A | 1/1997 | Beaudoim | |
| 5,626,684 A | 5/1997 | Rodarte et al. | |
| 5,647,977 A | 7/1997 | Arnaud | |
| 5,647,986 A | 7/1997 | Nawathe et al. | |
| 5,687,092 A | 11/1997 | Bretmersky et al. | |
| 5,855,791 A | 1/1999 | Hays et al. | |
| 5,971,303 A | 10/1999 | Pugh-Gottlieb | |
| 6,048,175 A | 4/2000 | Corlew et al. | |
| 6,054,044 A * | 4/2000 | Hoffland et al. | 210/96.1 |
| 6,148,838 A | 11/2000 | Tsay et al. | |
| 6,178,393 B1 * | 1/2001 | Irvin | 703/10 |
| 6,217,770 B1 | 4/2001 | Haney et al. | |
| 6,241,485 B1 | 6/2001 | Warwick | |
| 6,290,852 B1 * | 9/2001 | Heine et al. | 210/622 |
| 6,312,589 B1 | 11/2001 | Jarocki et al. | |
| 6,356,205 B1 | 3/2002 | Salvo et al. | |
| 6,378,554 B1 | 4/2002 | Struthers | |
| 6,408,471 B1 | 6/2002 | Teran et al. | |
| 6,488,854 B2 | 12/2002 | O'Leary et al. | |
| 6,491,060 B2 | 12/2002 | Struthers | |
| 6,601,005 B1 | 7/2003 | Eryurek et al. | |
| 6,625,519 B2 | 9/2003 | Goodwin et al. | |
| 6,669,839 B2 | 12/2003 | Tipton et al. | |
| 6,721,683 B2 | 4/2004 | Harris et al. | |
| 6,757,623 B2 | 6/2004 | Schutzbach et al. | |
| 6,770,198 B2 | 8/2004 | Newton et al. | |
| 6,782,301 B2 | 8/2004 | Maruyama | |
| 6,807,494 B2 | 10/2004 | Schutzbach et al. | |
| 6,960,304 B1 | 11/2005 | Brown et al. | |
| 7,002,481 B1 | 2/2006 | Crane et al. | |
| 7,028,700 B2 | 4/2006 | Wheat et al. | |
| 7,075,425 B2 | 7/2006 | Capano et al. | |
| 7,081,203 B2 | 7/2006 | Helm | |
| 7,083,720 B2 | 8/2006 | Miller | |
| 7,233,252 B1 | 6/2007 | Hardin | |
| 7,255,233 B2 | 8/2007 | Daniels et al. | |
| 7,289,923 B2 | 10/2007 | Marovitz | |
| 7,357,341 B2 | 4/2008 | Gutwein et al. | |
| 7,452,468 B2 | 11/2008 | Smith | |
| 7,507,372 B2 | 3/2009 | Polak | |
| 7,647,136 B2 | 1/2010 | McDowell | |
| 7,699,985 B2 | 4/2010 | Cote et al. | |
| 7,768,413 B2 | 8/2010 | Kosuge et al. | |
| 7,846,408 B1 * | 12/2010 | Cox, Jr. | 423/244.01 |
| 7,905,245 B2 | 3/2011 | McQuade et al. | |
| 7,926,503 B2 | 4/2011 | Kuhnle et al. | |
| 7,931,080 B2 | 4/2011 | O'Brien | |
| 7,950,464 B2 | 5/2011 | Atencio et al. | |
| 8,047,406 B2 | 11/2011 | Harrold | |
| 8,262,914 B2 * | 9/2012 | Mitzlaff et al. | 210/709 |
| 2006/0089752 A1 * | 4/2006 | Voigt | 700/282 |
| 2008/0073270 A1 * | 3/2008 | Smith | 210/616 |
| 2008/0082215 A1 * | 4/2008 | McDowell | 700/282 |
| 2009/0283457 A1 | 11/2009 | Buchanan et al. | |
| 2010/0122913 A1 * | 5/2010 | Matousek et al. | 205/743 |
| 2011/0162738 A1 | 7/2011 | Kuhnle et al. | |
| 2012/0222994 A1 | 9/2012 | Smaidris | |

OTHER PUBLICATIONS

Hesketh et al, "Innovative and Economical Bench-scale Process Engineering Experiments", IEEE, 2000,pp. 327-334.*
Ranganathan-G., "Steps to Automated Treatment", Pollution Engineering, 3 pages.*
U.S. Appl. No. 11/958,430, filed Dec. 2007, Thomas F. Smaidris et al.
Barritt-D.R., "Ensuring Public Safety in PLC Controlled Water Treatment Plant", IEEE, 10 pgs., 1994.
Control Engineering Company, "Utility Integrates Control Across 41 Remote Stations", vol. 52, 2 pages, 2005.
Flores et al., "An Intelligent System for Distributed Control of an Anaerobic Wastewater Treatment Process", Pergamon, Engineering Applications of Artificial Intelligence, pp. 485-495, 2000.
Hewitt-D., Advances in Ultrasonice Controllers-New Energy-Saving Solutions for Pump Control, World Pumps, pp. 44-46, May 2006.
Sanchez-J., "Municipality Upgrades to Wireless SCADA System for Future Growth", World Pumps Article, pp. 30-33, Mar. 2006.
Schutze et al., "Real Time Control of Urban Wastewater Systems-Where Do We Stand Today?" Elsevier, pp. 335-348, 2004.
Tevjashev, et al., "Informational Analytical System of Control of Master Schedules of Sewer Pump Station", IEEE, 1 page, 2004.

* cited by examiner

EXEMPLARY PUMP STATION

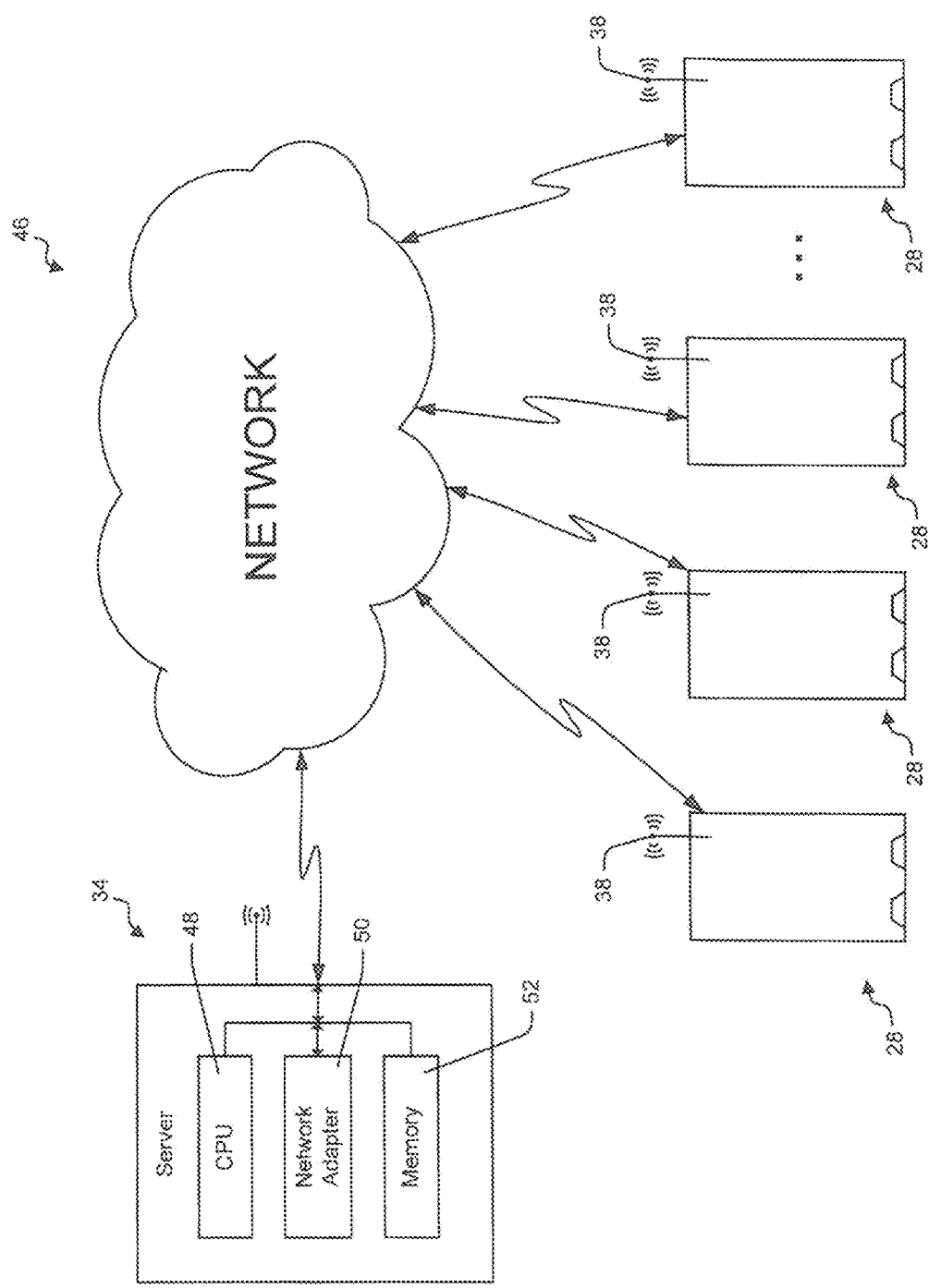

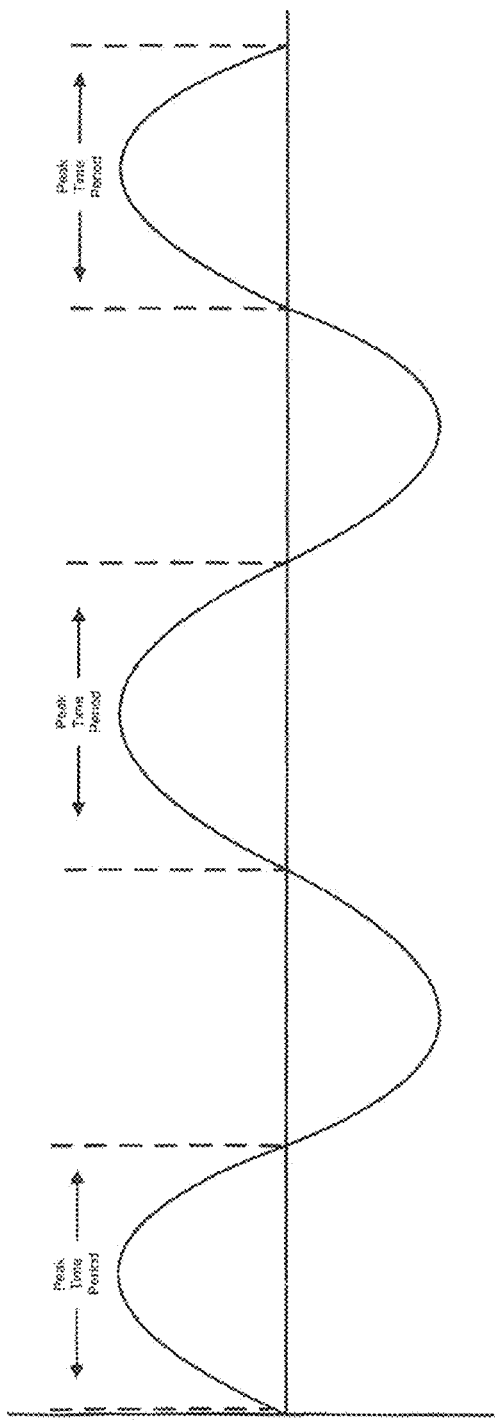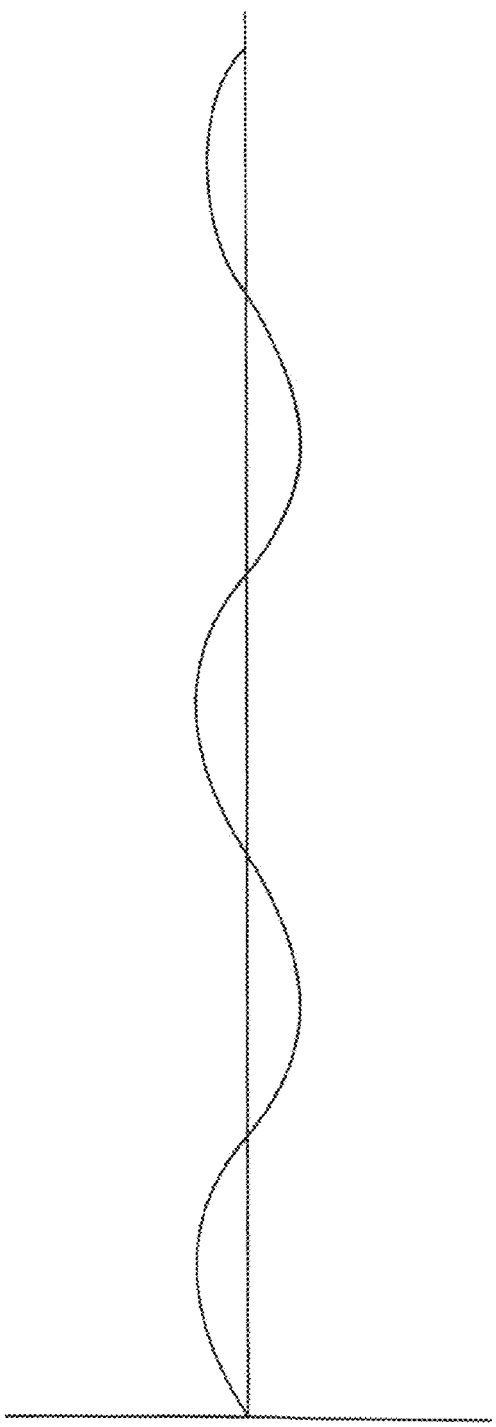

FLUID FLOW MANAGEMENT THROUGH A WASTEWATER LEVEL MANIPULATION SYSTEM AND ASSOCIATED METHODS

RELATED APPLICATIONS

The present application is a continuation application of U.S. patent application Ser. No. 13/372,778 titled Fluid Flow Management System and Associated Methods and filed on Feb. 14, 2012, which is a continuation in part application of U.S. patent application Ser. No. 11/958,430 titled Wastewater Collection Flow Management System and Techniques and filed on Dec. 18, 2007, which, in turn, claimed priority to U.S. Provisional Patent Application Ser. No. 60/870,862, filed on Dec. 20, 2006, titled Wastewater Collection Row Management System, the entire contents of each of which are hereby incorporated into this application by reference.

FIELD OF THE INVENTION

The present invention relates, in general, to fluid transfer systems and, more particularly, to management of both fluid flow and pumps used to move fluid through a fluid transfer system, and associated methods.

BACKGROUND OF THE INVENTION

In a wastewater collection service area, many pump stations often pump wastewater to a treatment facility or to a master pump station through a main. The main may sometimes be gravity fed, or may be under pressure, i.e., a force main. The mains may be used to move wastewater (under pressure in some instances) to a wastewater treatment plant. Typically, force mains may be used to move wastewater over terrain that is not conducive to gravity flow. A typical wastewater pump station may house more than one pump. The number and size of the pumps at each station may be determined by the amount of wastewater inflow to that station, and by the amount of storage capacity in a wet well. There is normally no coordination of activity between pumping stations. Pump operations at a given wastewater pump station are typically controlled locally. In other words, the pumps within the wastewater pump stations are not in communication with one another and do not operate based on any coordination with one another. When the influent in the wet well of a wastewater pump station reaches a certain predetermined level, a sensor may trigger one of the pumps to start. If the pump's action is not sufficient to handle the inflow of wastewater, additional pumps may be activated to manage the inflow of wastewater into the wet well. When the wet well level lowers to a desired level, another sensor may cause the pump(s) to turn off.

Most wastewater is generated during two or three peak periods of daily activity. These peak periods may occur in the morning when families are rising for the day and in the early evening when families are returning home from work and school. Throughout the operating day, but especially during these peak periods, it is normal for many wet wells (also sometimes referred to as stations or lift stations) to pump simultaneously into the same force main since there is no coordination between pumping stations.

The pressure caused by a fluid is sometimes referred to as head pressure. Accordingly, and with respect to force mains, the pressure within the force main may be referred to as head pressure. The more stations that simultaneously pump, the higher the head pressure within the force main. Pumps cannot pump efficiently when pumping against higher pressures. Smaller pumps may not be able to pump at all when more powerful pumps are dominating the force main. This may cause pumps to run longer in order to accomplish their purpose. This condition may result in drastically higher energy costs, increased wear and tear on pumps and mains, and a greater likelihood of failures of the pipes within the system which may, in turn, cause sewage spills. Conversely, there are also many periods during which no pumps are running. When wastewater generation is at the lowest volume, e.g., in the middle of the night or, perhaps at mid-morning or mid-afternoon (when many users of a wastewater treatment system are either at work or at school), the majority of pumping stations are frequently dormant.

Wastewater treatment plants are designed and sized either to accommodate estimated daily total inflows, or to serve peak demands on the wastewater treatment system. Plants designed to accommodate a daily average inflow run the risk of being incapable of handling those few peak hours of the day when most of the wastewater inflow occurs. One solution to this problem has been to design wastewater basins to temporarily hold overflow wastewater while capacity at the wastewater treatment plant is cleared. These wastewater basins are also sometimes referred to as surge basins. Surge basins can be costly to construct and can also be costly to maintain. Further, there can be health risks associated with surge basins that can be associated with untreated wastewater being stored within the sure basin for various amounts of time.

Those wastewater treatment plants that are designed to accommodate the peak inflow hours sit idle for most of the day, since the peak inflows only occur during a few hours out of a 24-hour operational day. Failure to provide sufficient capacity will likely result in pretreatment spills, damage to infrastructure which results in high repair costs and loss of service to customers, as well as possible damage to customer property. Wastewater treatment plants that are overdesigned, i.e. designed to meet the peak flow periods, can be wasteful of taxpayer dollars during the initial construction, can result in higher maintenance and operation costs, and also result in higher energy usage.

Very frequently, wastewater treatment plants are sized based on estimated daily total inflows and are measured in terms of millions of gallons per day (MGD). When, over a period of years, population increases exceed long-term plans, the addition of surge tanks to temporarily store the unmanageable inflow is necessary to prevent overflows at the point of inflow of the wastewater into the wastewater treatment plant, also known as the headworks. Later, during lower flow times, surge tank contents may be processed through the treatment system. Surge tanks provide temporary storage at the wastewater treatment plant to accommodate the wastewater plant's processing rate, but do not lessen flow into the infrastructure. Accordingly, although surge tanks address the issue of storing excess wastewater that needs to be treated, the problem of unmanageable flow of wastewater within a wastewater treatment system and, more particularly, within the pump stations and pipes that manage the flow of the wastewater to the wastewater treatment plants, remains unresolved.

Wastewater collection systems have pump stations distributed throughout the service area that arbitrarily pump wastewater to the wastewater treatment plants. The action of the pump stations may be characterized as arbitrary in that there is no coordination of the pumping function of one pump station with the pumping function of any other pump stations in a wastewater treatment system. These pumps only respond to local conditions and are activated by local level sensors without regard to events or conditions elsewhere. As a result, during peak activity hours, e.g., from 6 AM to 8 AM and from 5 PM to 7 PM, these pump stations operate more frequently, thereby raising the inflow into the plant, frequently surpassing the plant's processing capability. Even more troubling, however, is the excess flow of wastewater through the force main of the wastewater treatment plant. It should be noted that these high inflow periods normally occur between periods during which there is very little, if any, flow into the wastewater treatment plant. The result is normally a need for a higher design margin and/or earlier system expansion.

Another consequence of unmanaged flow is reduced efficiency in managing biological treatment material at the wastewater treatment plant. The most efficient biomass management requires a relatively constant flow rate so that bacteria used in processing the wastewater can effectively interact with the influent waste. High or irregular flow rates can lessen the efficiency of the treatment system and the quality of the treated effluent.

Sewer mains are frequently sized to take into account future growth in a wastewater collection service area, but it is not unusual for years to pass before the volume of wastewater reaches the level for which the system was designed. During this time, the utility may experience maintenance problems if the volume of wastewater through the main is not sufficient to carry with it solids and silt. If the flow of wastewater is so small relative to the pipe size that it fails to reach a velocity known as "scour speed," solids may settle out of the liquid and accumulate in the bottom of the sewage mains. When this occurs, expensive specialty vehicles typically known as vacuum trucks are employed to clean out sediment that accumulates in the sewage system.

Accordingly, with the above in mind, it is noted that wastewater collection and treatment systems often operate under conditions in which pumps operate inefficiently, causing increased energy cost and wear and tear on costly equipment. It is further noted that peak flows into the treatment plant may result in accidental spillages and may impede the operational efficiency of the biological treatment processes utilized in the treatment plant. The above description also indicates that there are times when flow is inadequate to keep the force mains free of sediment, requiring the use of expensive special purpose trucks. In addition, the operational requirements of the various force mains may sometimes allows small pumps to run at the same time as larger pumps thereby causing the smaller pumps to operate against the higher pressure from the larger pumps resulting in considerable inefficiency in the operation of the smaller pumps. Also, existing systems frequently encounter situations where the wet wells to do not get pumped down sufficiently and therefore begin to generate septic conditions with the accompanying unpleasant smells. In light of the above deficiencies in the prior art, there exists a need for a flow management system that addresses the above referenced problems.

SUMMARY OF THE INVENTION

With the foregoing in mind, it is therefore an object of the present invention to provide a system to control fluid flow in a wastewater treatment system that can systematically manipulate pumps in wet wells to efficiently deliver wastewater to a wastewater treatment facility. It is also an object of the present invention to provide a system to control fluid flow that optimizes the use of pumps in a wastewater treatment system. It is further an object of the present invention to provide a system to control fluid flow that is energy efficient and that reduces wear on equipment and infrastructure. It is still further an object of the present invention to provide a system to control fluid flow that allows for an existing wastewater treatment plant to efficiently treat wastewater without the need for expansion. It is yet another object of the present invention to provide a system that reduces peak flow times so as to enhance efficiency of a wastewater treatment plant. One other object of the present invention is to anticipate peak flow rates and manipulate the flow of wastewater to a wastewater treatment plant to prevent an overflow.

These and other objects, features and advantages according to an embodiment of the present invention are provided by a system to control fluid flow in a wastewater treatment system. The wastewater treatment system may include a wastewater treatment plant and a main connecting a plurality of pump stations to the wastewater treatment plant and carrying wastewater to the wastewater treatment plant. Each of the pump stations is located external to the wastewater treatment plant and may include a wet well and a pump carried by the wet well. The system may include a central server and a sensor carried by each of the wet wells and in communication with the central server to sense a level of wastewater within the respective wet well. The pump may be automatically moved to an on position when the level of the wastewater in the respective wet well is at or above a first level. The pump may be moved to an off position when the level of the wastewater in the respective wet well is at or below a pump cutoff level. The central server may systematically manipulate the first level to selectively set the level of wastewater within the wet well.

The system may also include a transceiver in communication with the central server and the sensor. The transceiver may transmit information relating to the level of the wastewater within the wet well to the central server. The transceiver may receive information from the central server to systematically manipulate the first level to selectively set the level of wastewater within the wet well. The central server may receive information relating to a number of pumps that are operating in the on position at a given time. The central server may systematically manipulate the first level to operate the pump in the on position based on a total number of pumps that are operating in the on position at the given time.

The central server may manipulate the first level so that the pump may be moved from the off position to the on position depending on the number of pumps that are operating in the on position at the given time. A limited number of pumps may be operated in the on position at a given time. More specifically, the central server may prioritize the limited number of pumps that may be operated in the on position at the given time based on the level of wastewater in the wet well. Alternately, the central server may prioritize the limited number of pumps that may be operated in the on position at the given time based on proximity to the wastewater treatment plant.

An embodiment of the present invention contemplates that the system may include a flow meter carried by the main adjacent the wastewater treatment plant and in communication with the central server to sense a flow rate of wastewater into the wastewater treatment plant. The central server may transmit a signal to the transceiver to manipulate the first level responsive to the sensed flow rate of wastewater into the wastewater treatment plant.

An average flow rate of wastewater in the wastewater system may be determined. A peak time period may thereafter be defined as a time period when the flow rate of the wastewater in the wastewater treatment system is above the average flow rate. The central server may manipulate the first level to operate the pump in the on position prior to the peak time period to lower the level of wastewater within the wet well. The central server may manipulate the first level to operate the pump in the on position after the peak time period to lower the level of wastewater within the wet well, and the central server may raise the first level during the peak period to allow for the level of wastewater within the wet well to rise before being pumped to the wastewater treatment plant. The central server may manipulate the first level to operate the pump in the on position for a period of time before the peak time period and for a period of time after the peak time period. The period of time before the peak time period and the period of time after the peak time period preferably have a collective length sufficient to lower the flow rate of the wastewater within the wastewater treatment system during the peak time period to a flow rate that is equal to or less than the average flow rate. In one embodiment of the system according to the present invention, the central server may systematically manipulate the first level to operate the pump in each of the wet wells in the on position at a certain time for a certain period of time. In such an embodiment, the central server may manipulate the first level to move a fixed number of pumps to the on position for the certain time period.

The central server may operate each of the pumps in each of the wet wells in a scouring mode. The scouring mode may be defined by the central server determining the level of the wastewater in each of the wet wells and by the central server manipulating the first level in each wet well in which the wastewater is above the pump cutoff level to move the pumps to the on position for a time period. The wastewater treatment plant may include a wastewater basin to receive wastewater overflow. The wastewater basin may include a level sensor that is in communication with the central server to sense a level of wastewater within the wastewater basin. The central server manipulates the first level to set the level of wastewater within the wet wells responsive to the level sensor in the wastewater basin.

BRIEF DESCRIPTION OF THE DRAWINGS

FIG. 16 is a schematic diagram of a communication aspect of a system to control fluid flow according to an embodiment of the present invention.

FIGS. 17A and 17B are graphical illustrations showing results of a flow management technique when using the system according to the present invention.

DETAILED DESCRIPTION OF THE PREFERRED EMBODIMENT

Figure 1:
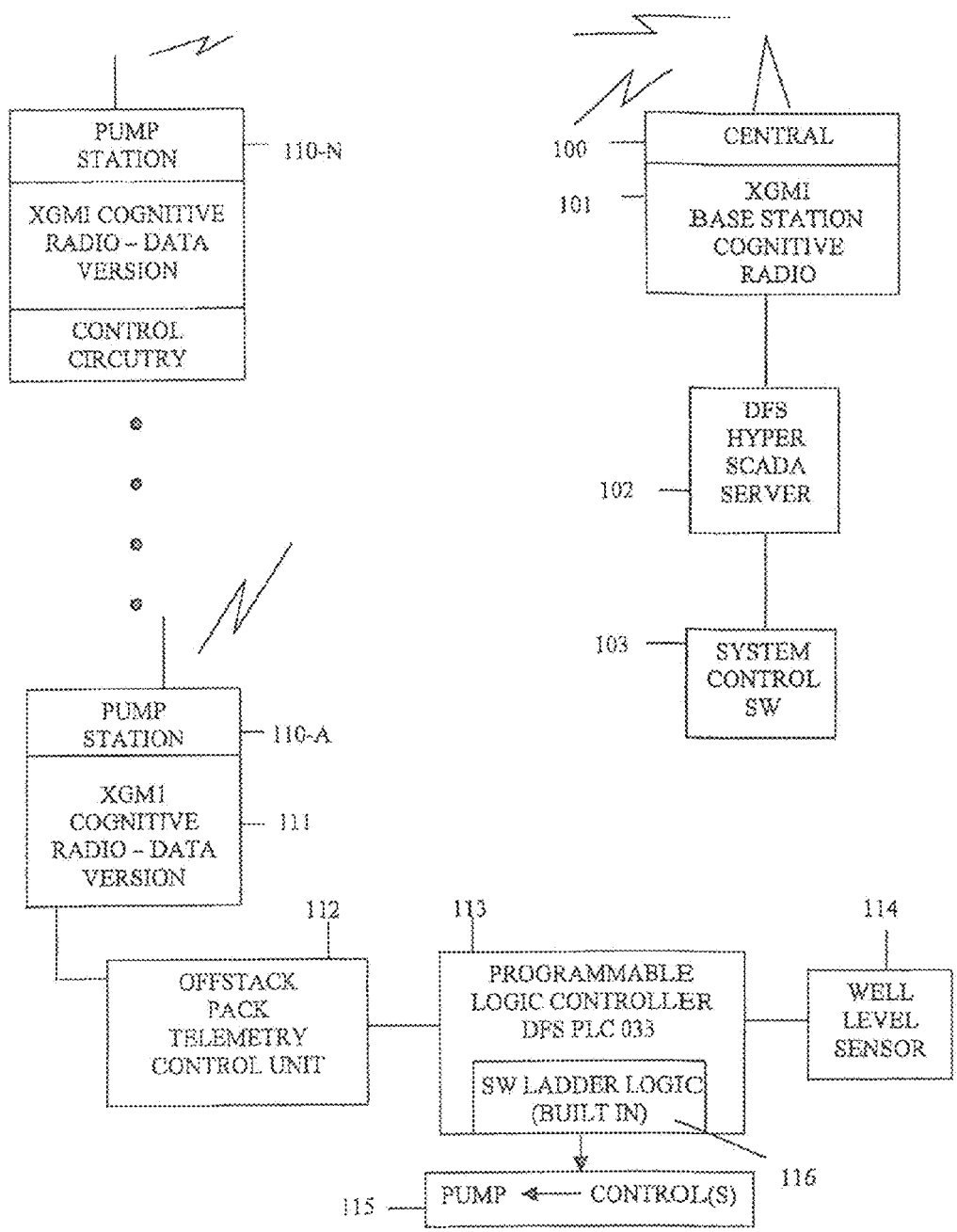
FIG. 1 is a block diagram illustrating how a plurality of pump stations communicate with a central server in a wastewater treatment system according to an embodiment of the present invention.
Figure 2A:
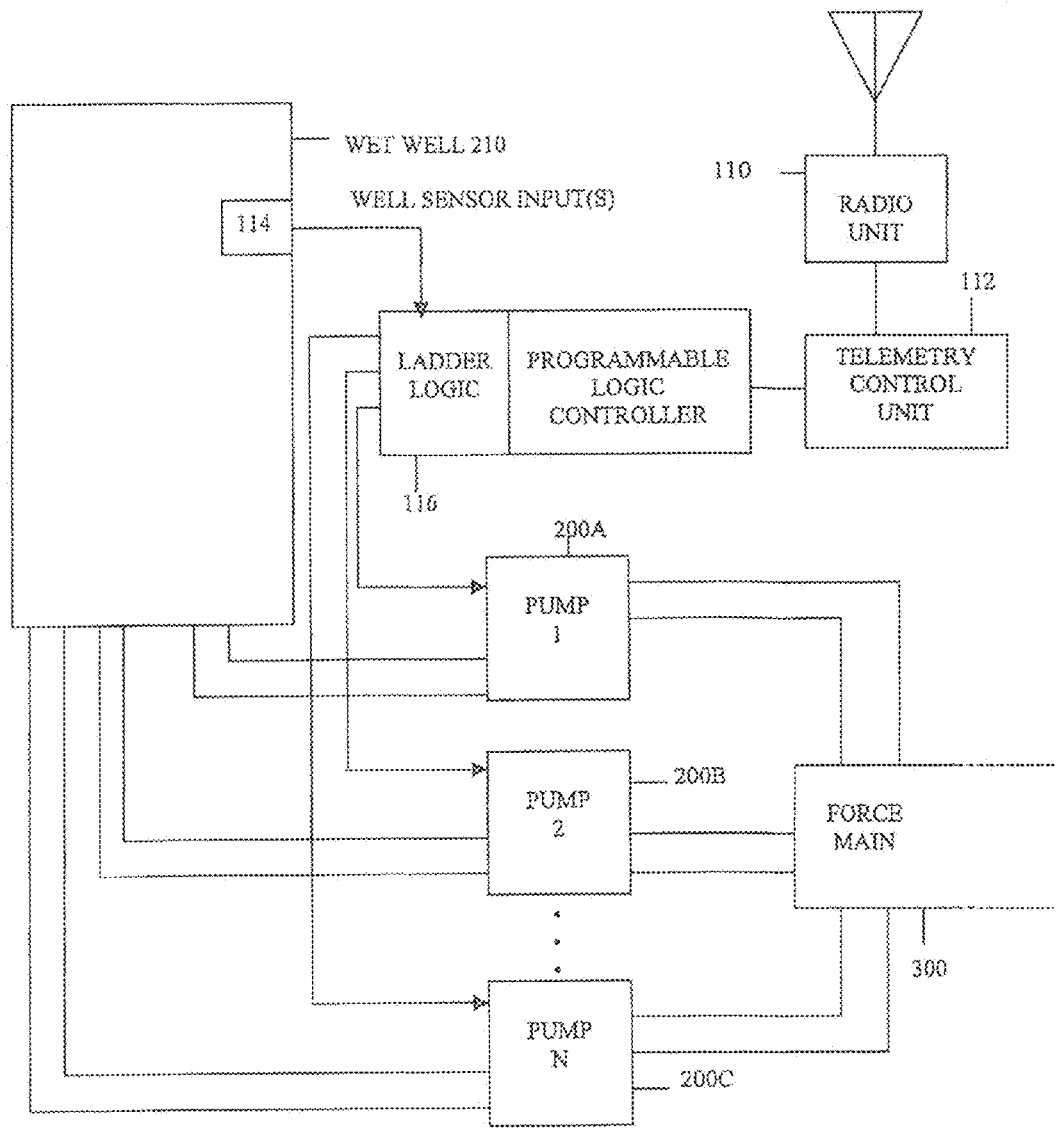
FIG. 2A is a block diagram of an exemplary pump station of the wastewater treatment system according to an embodiment of the present invention.
Figure 2B:
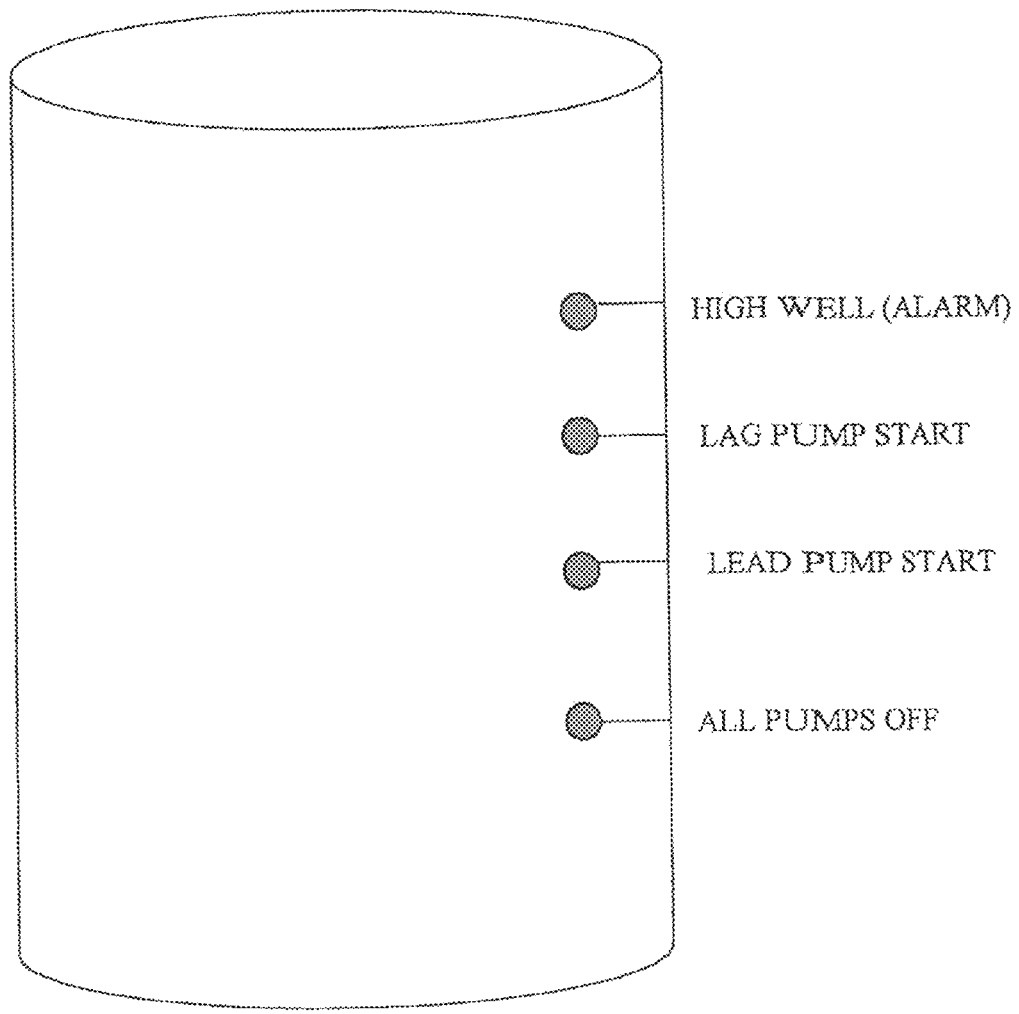
FIG. 2B is a diagram showing a typical level sensor arrangement in a wet well.
Figure 2C:
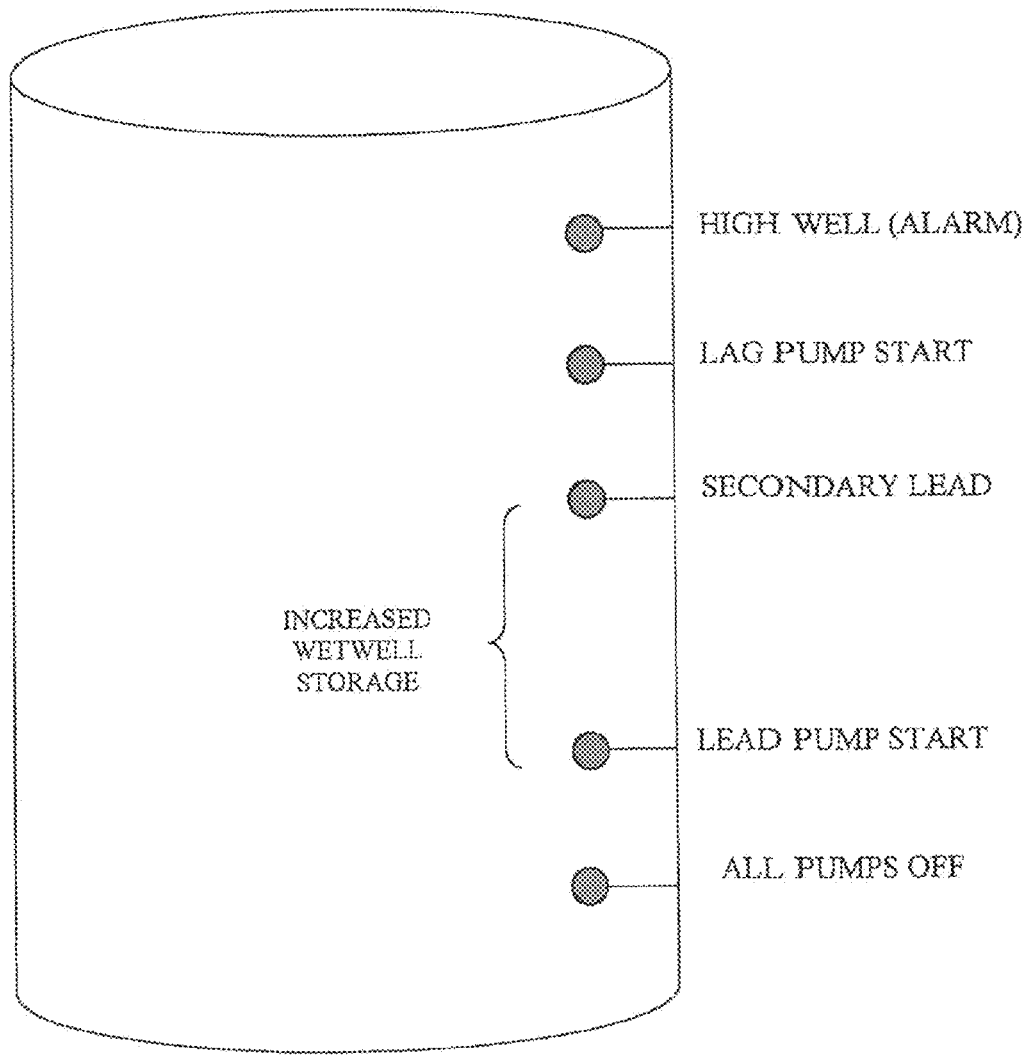
FIG. 2C is a diagram showing a level sensor arrangement in a wet well of the wastewater treatment system according to an embodiment of the present invention.
Figure 3:
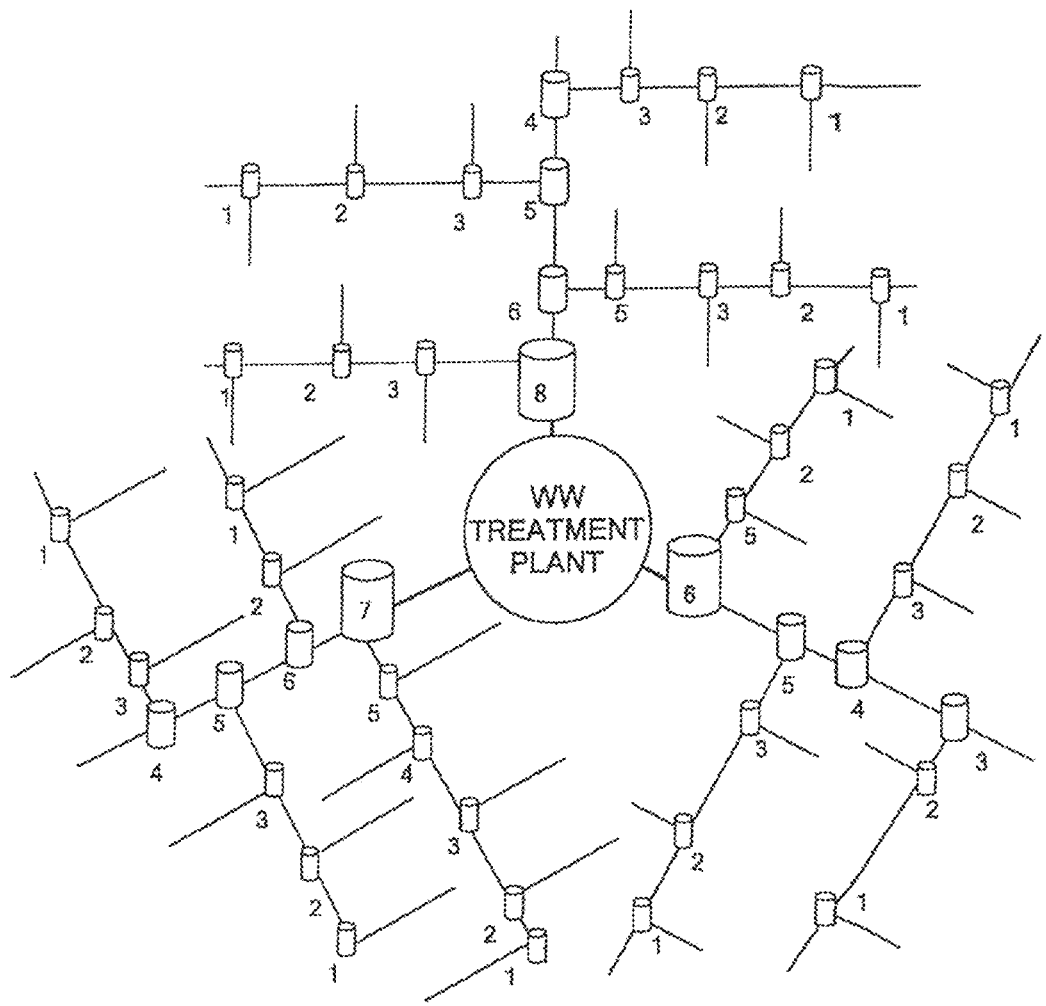
FIG. 3 illustrates an example of a plurality of pump stations interconnected to a wastewater treatment plant using force mains.
Figure 4:
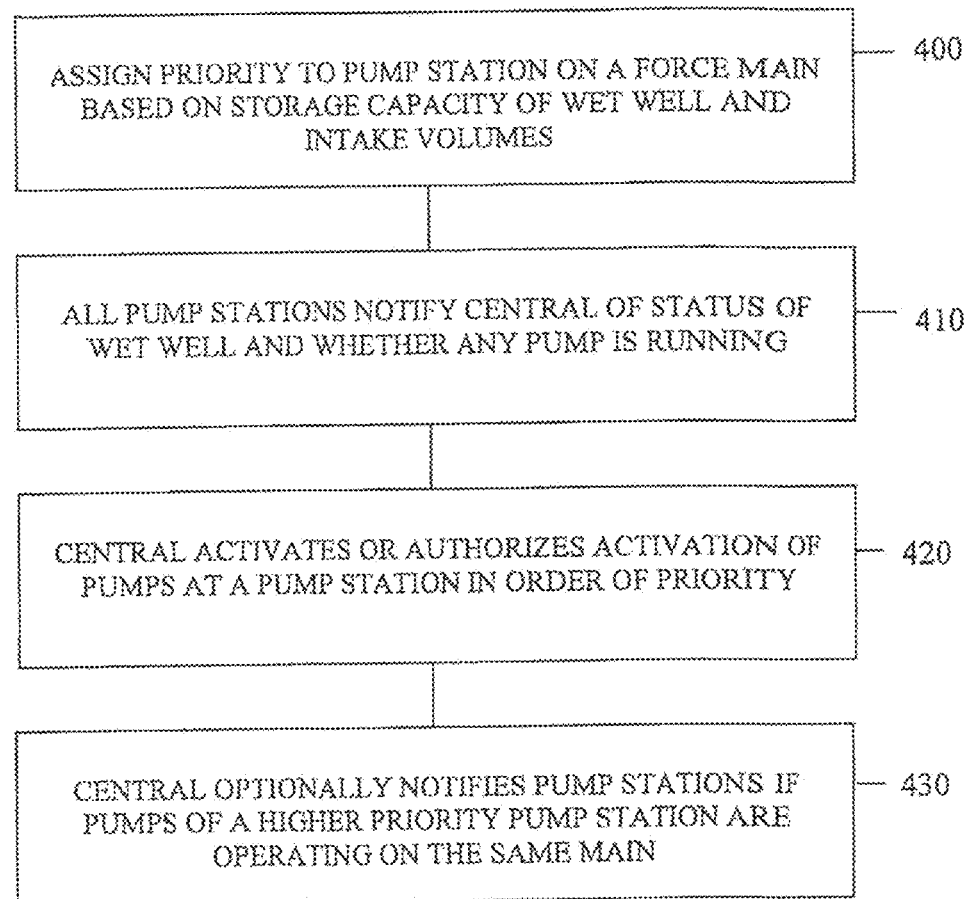
FIG. 4 is a flow chart of a pump management process using pump priorities in accordance with an embodiment of the present invention.
Figure 5:
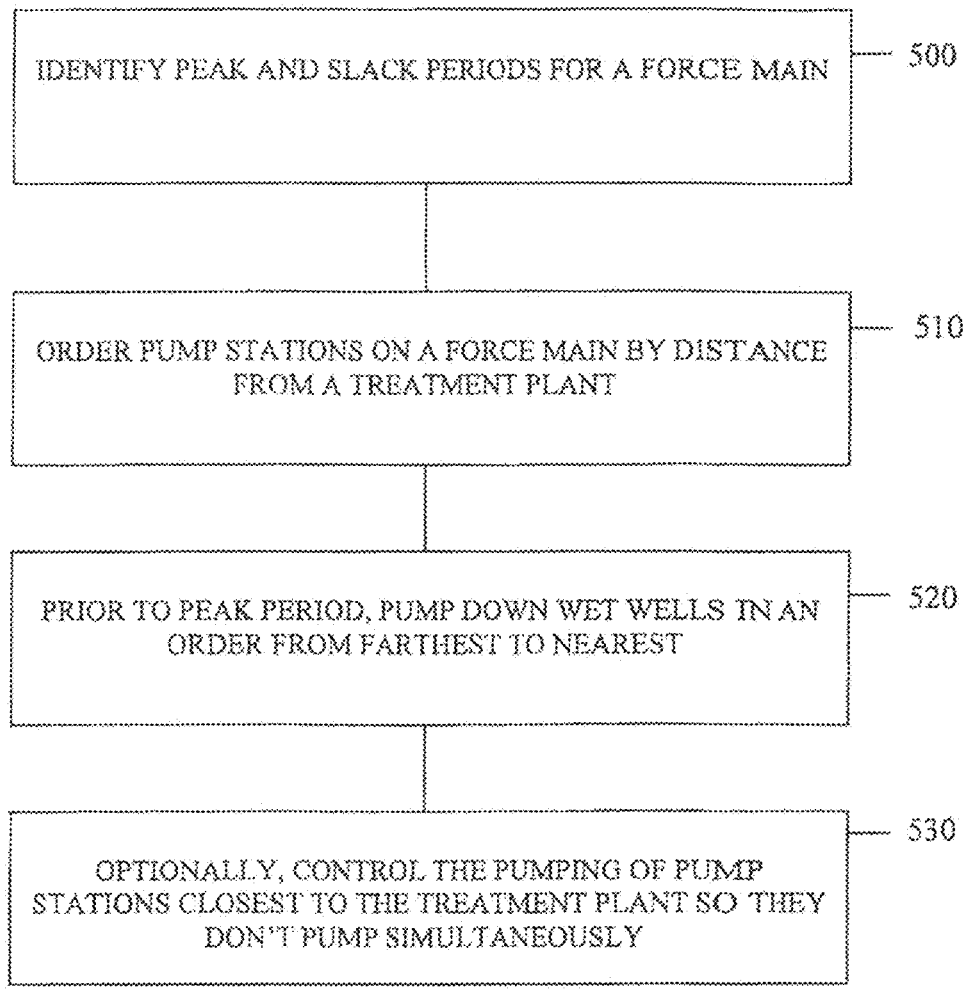
FIG. 5 is a flow chart of a flow management process in accordance with an embodiment of the present invention.
Figure 6A:
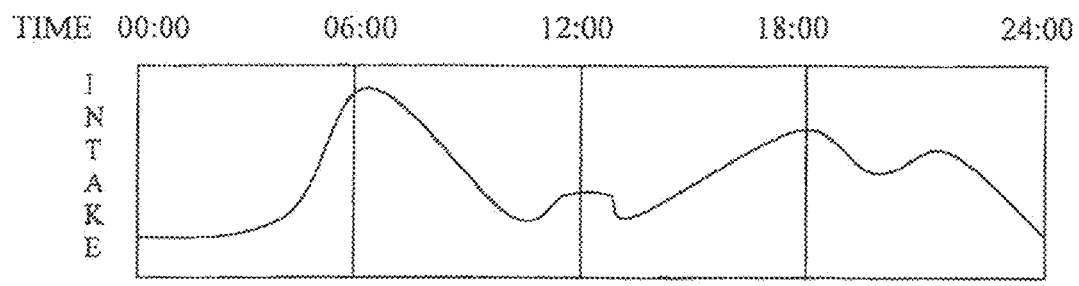
FIG. 6A illustrates flow volumes as a function of time of day without the use of a flow management aspect according to an embodiment of the present invention.
Figure 6B:
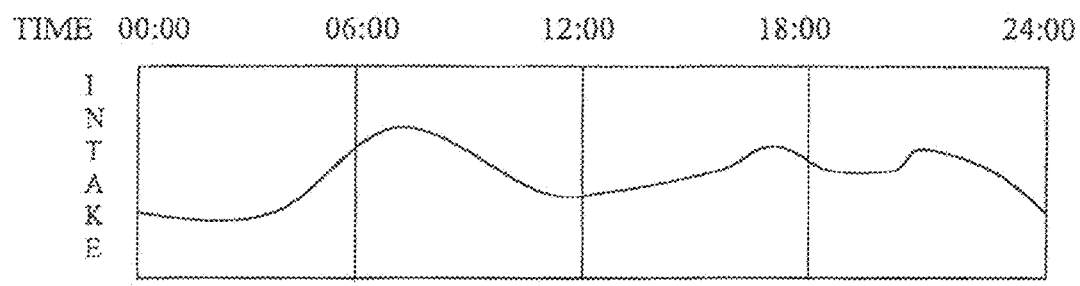
FIG. 6B illustrates flow volumes as a function of time of day with the use of the flow management aspects according to an embodiment of the present invention.
Figure 7:
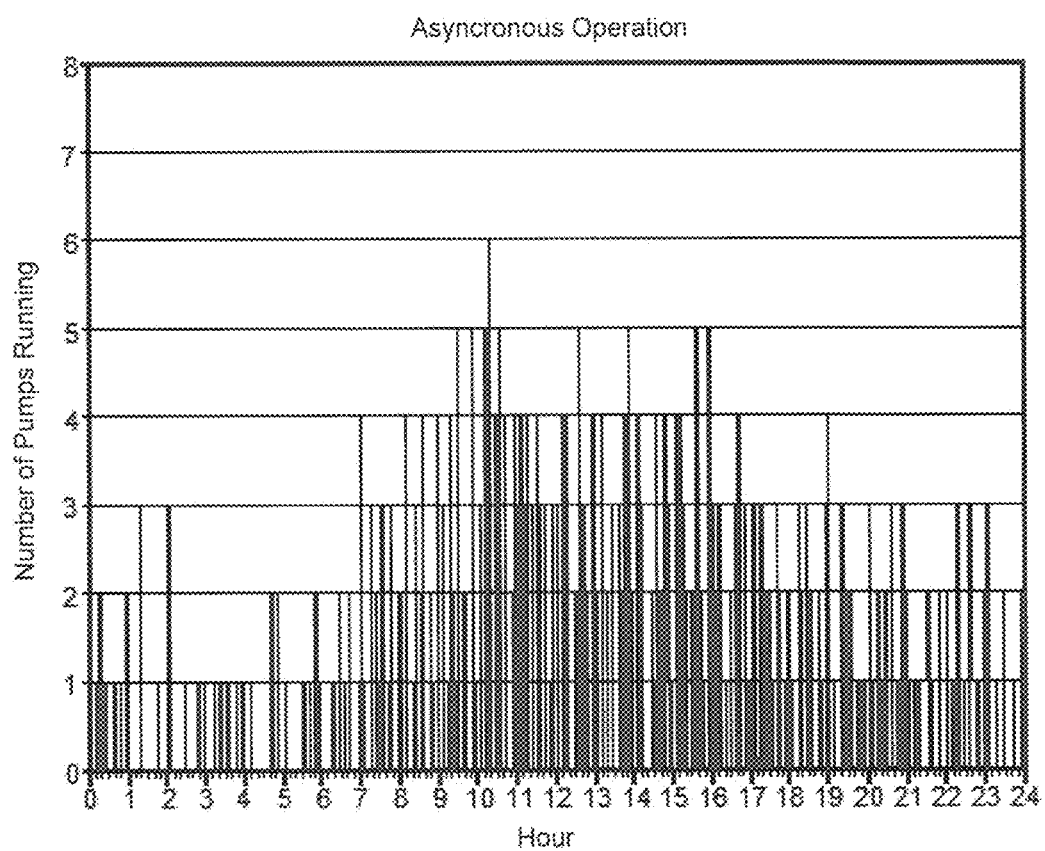
FIG. 7 is a graph showing the number of pumps running as a function of time of day without incorporating flow management according to an embodiment of the present invention.
Figure 8:
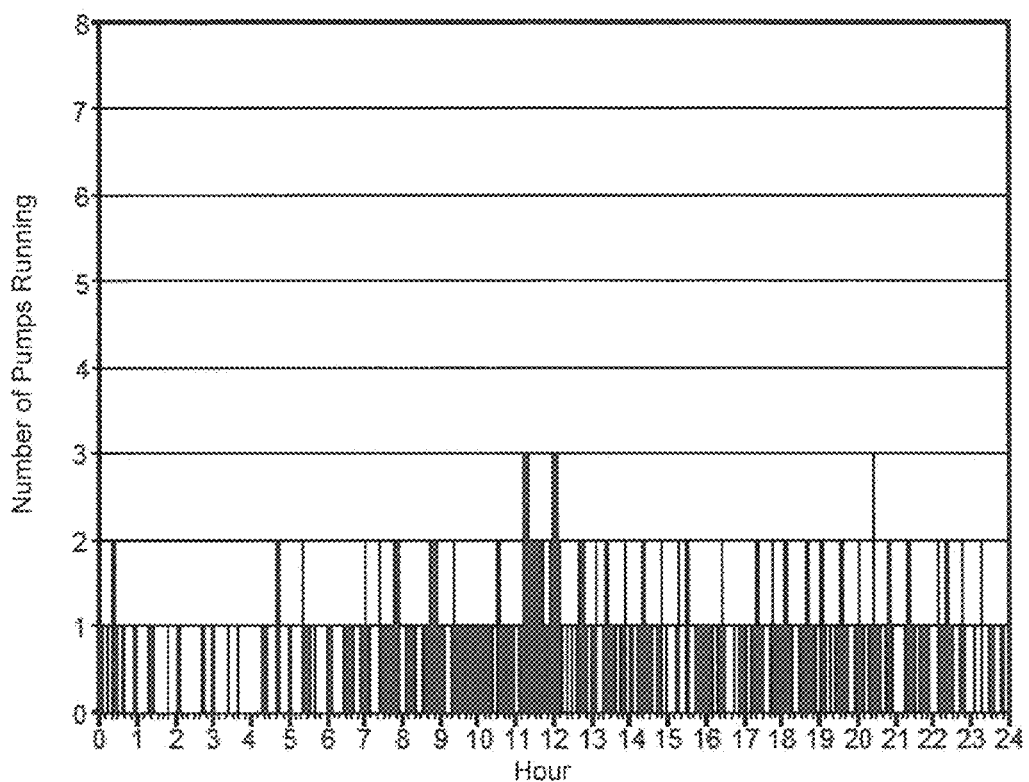
FIG. 8 is a graph showing the number of pumps running as a function of time of day incorporating flow management according to an embodiment of the present invention.
Figure 9:
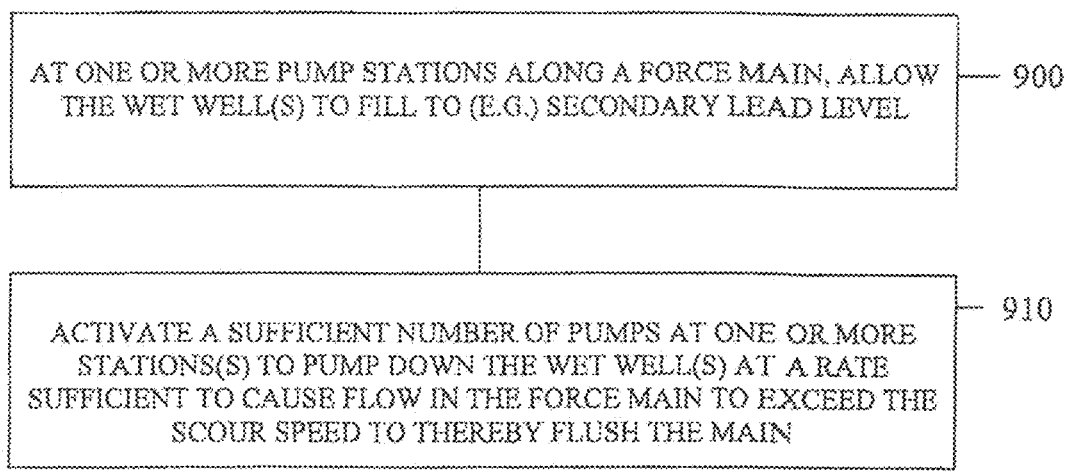
FIG. 9 is a flow chart illustrating a process for sediment reduction in accordance with an embodiment of the present invention.
Figure 10:
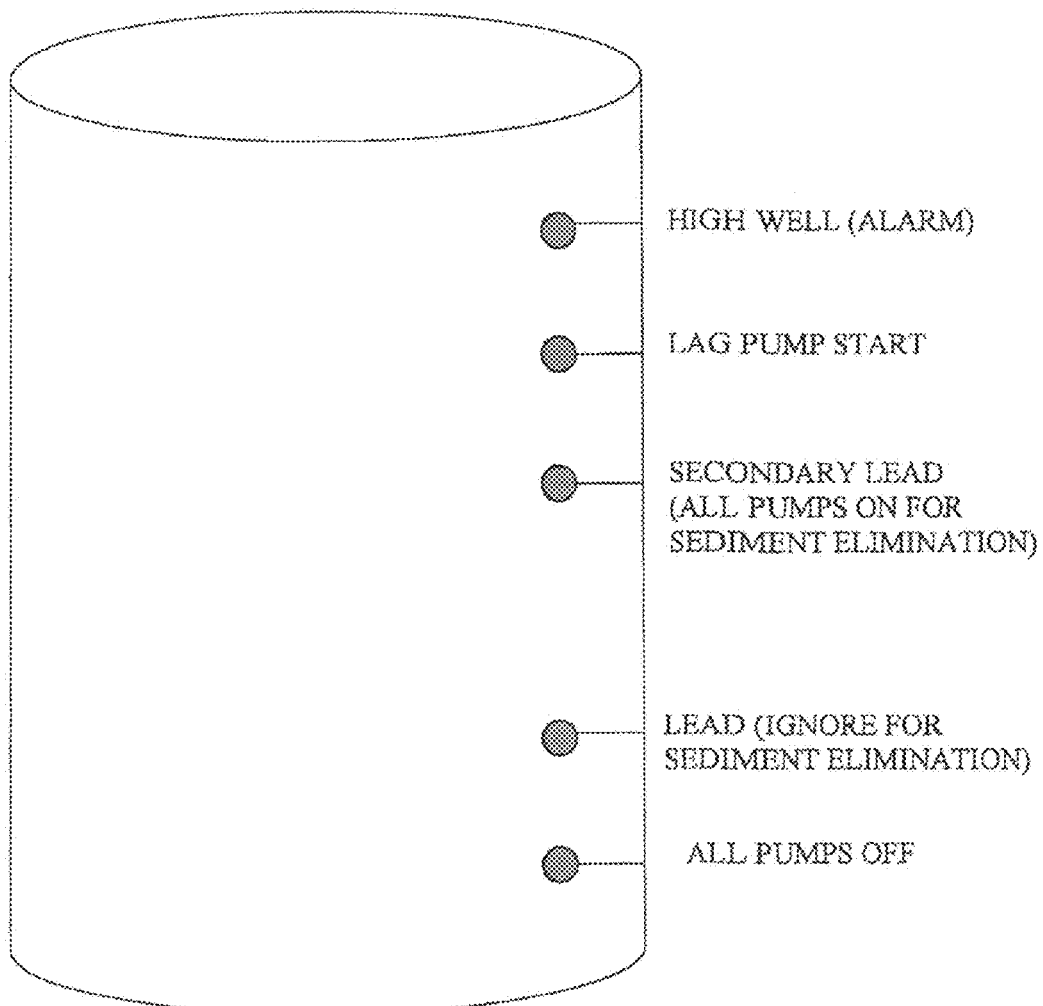
FIG. 10 is a diagram of a wet well according to an embodiment of the present invention showing use of a secondary lead level detection for sediment reduction.
Figure 11:
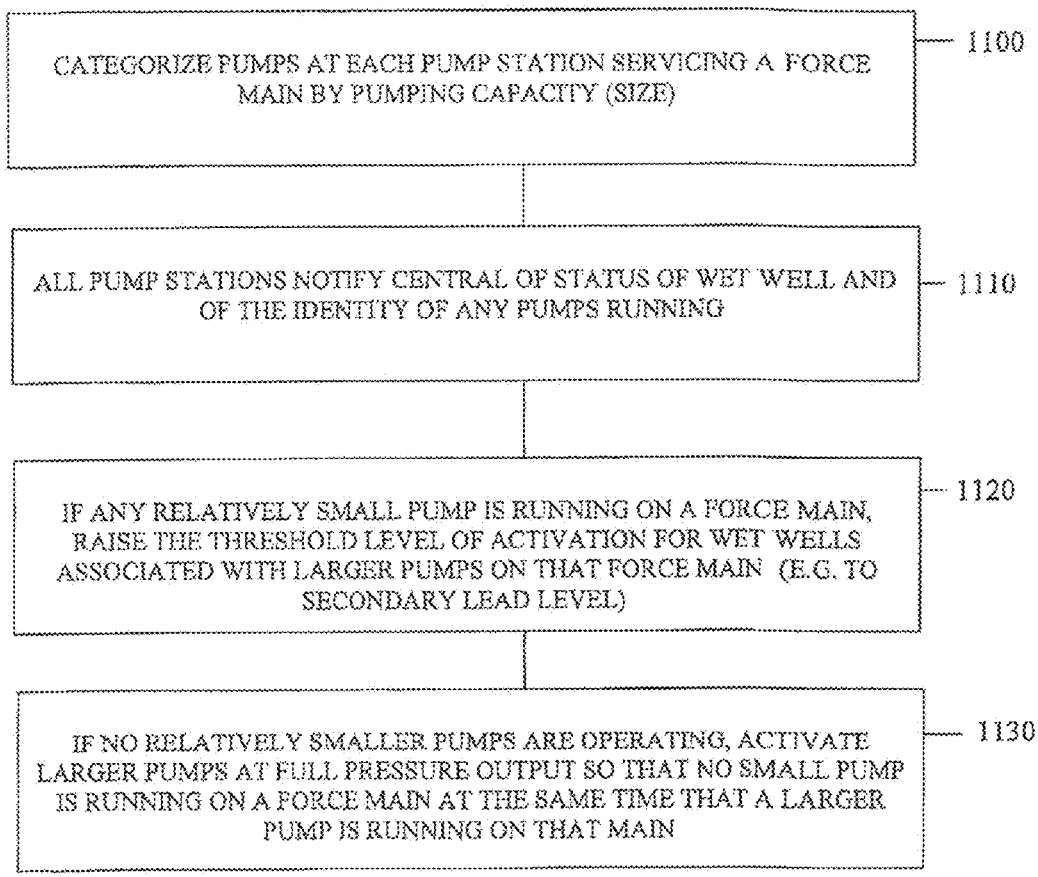
FIG. 11 is a flow chart of a process for pressure management in accordance with an embodiment of the present invention.
Figure 12:
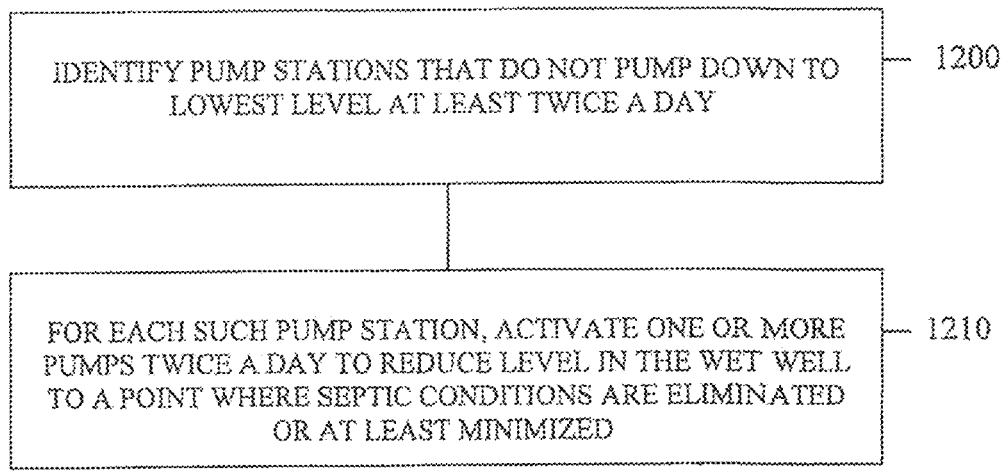
FIG. 12 is a flow chart of a process for septic elimination in accordance with an embodiment of the present invention.

The present invention will now be described fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art will realize that the following embodiments of the present invention are only illustrative and are not intended to be limiting in any way. Other embodiments of the present invention will readily suggest themselves to such skilled persons having the benefit of this disclosure.

FIGS. 1 through 12 are described in U.S. patent application Ser. No. 11/958,430, which claimed the benefit of U.S. Provisional Patent Application No. 60/870/862. The contents of each of these applications are incorporated herein by reference, in their entireties. As such, the descriptions of FIGS. 1 through 12 will not be repeated herein. Further, the patent reference numbers that appear in FIGS. 1-12 will not be repeated herein. The patent reference numbers that appear in FIGS. 1-12 are sufficiently described in U.S. patent application Ser. No. 11/958,430, and require no further discussion herein.

Referring now to FIGS. 13-18, additional aspects of a system 20 to control fluid flow in a wastewater treatment system are now described. Throughout this disclosure, the system 20 may be referred to as a system to control fluid flow, a fluid flow control system, a control system, a wastewater treatment control system, or a system to control fluid flow in a wastewater treatment system. Various terms that refer to the system 20 are not meant to be limiting in any way, and should not be construed to limit the invention. Instead, this is used for the sake of clarity. Additionally, those skilled in the art will appreciate that although the following disclosure is primarily directed to use in the wastewater treatment industry, the system 20 according to various embodiments of the present invention may advantageously be used to control any type of fluid in any type of system. In the example of a wastewater treatment application, it is contemplated that the fluid to be controlled is wastewater that is being moved through various pipes and into a main (sometimes a force main) to a wastewater treatment plant. It is contemplated that the fluid that is controlled in the system 20 according to an embodiment of the present invention may be water in a water distribution application, or reuse water in an irrigation system application. Accordingly, the system 20 according to embodiments of the present invention can advantageously be used in connection with any application that involves moving and/or controlling the flow of fluids.

With the above in mind, an embodiment of the present invention is directed to a system 20 to control fluid flow in a wastewater treatment system 22. The wastewater treatment system 22 may include a wastewater treatment plant 24 and a main 26 connecting a plurality of pump stations 28 to the wastewater treatment plant. As perhaps best illustrated in FIG. 13, the main 26 may include a plurality of mains that carry fluid from the pump stations 28 to the wastewater treatment plant 24. The main 26 may, for example, be a forced main. In other words, the main 26 may be under pressure in order to move the fluid from the pump stations 28 to the wastewater treatment plant 24. A force main is generally used in locations that are geographically flat, i.e., areas that do not have elevation changes. In geographical locations where there are elevation changes, fluid may be moved their source of origin, e.g., a residential structure, to a wastewater treatment plant 24 using gravity flow. In these cases, there may not be a need for a pump station. Even in geographical locations where there are elevation changes, the origination point of the wastewater may be too far away from the wastewater treatment plant 24 and, therefore, pump stations may be required to move the wastewater to the wastewater treatment plant. Accordingly, pump stations 28 (also known in the art as lift stations) must be used to pump the fluid to higher elevations, thereby allowing the force of gravity to be used to move the fluid to the wastewater treatment plant 24.

Figure 13:
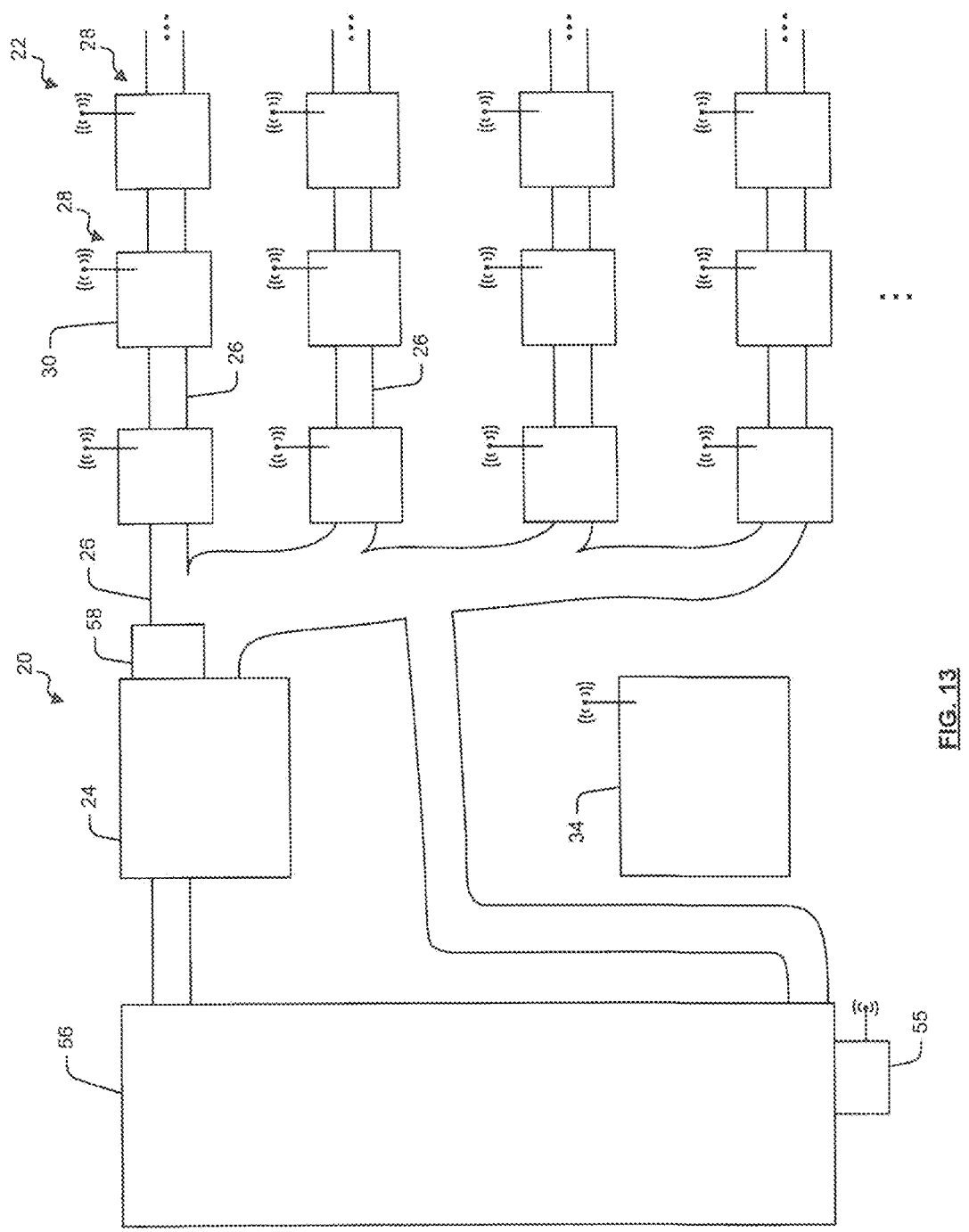
FIG. 13 is a schematic block diagram of a system to control fluid flow according to an embodiment of the present invention.

As also illustrated in FIG. 13, a plurality of pump stations 28 may be connected in series to move fluid to a wastewater treatment plant 24. Those skilled in the art will appreciate that fluid is pumped from a source location, i.e., a residential neighborhood, a business, or any other location where wastewater may originate, to a wet well 30 of the pump station 28. The fluid may then be pumped from the wet well 30 to the wastewater treatment plant 24. In some instances, it is common for fluid from one wet well 30 to be pumped through a main 26 to another wet well along its destination to the wastewater treatment plant 24. Those skilled in the art will appreciate that the configuration of the wastewater treatment system 22 illustrated in FIG. 13 is exemplary in nature, and is not meant to limit the system 20 according to an embodiment of the present invention in any way. Further, and as indicated above, although the system 20 according to an embodiment of the present invention is illustrated as being used in connection with carrying wastewater to a wastewater treatment plant 24, the system may be used in connection with any fluid flow, or fluid management system.

Each of the pump stations 28 illustratively include a wet well 30 and a pump 32 carried by the wet well 30. In many instances, it is common for more than one pump 32 to be carried by the wet well 30. As perhaps best illustrated in FIG. 14, a pair of pumps 32 may be carried by the wet well 30 of the pump station 28. In such an embodiment, one of the pumps 32 may be a main pump, while a second one of the pumps may be used for emergency operation, i.e., the secondary pump (or as many other pumps in excess of the first pump) be used to accommodate enhanced flow of fluid within the wet well 30. Those skilled in the art will appreciate that any number of pumps 32 may be positioned within the wet well 30, and that the appended drawings are not meant to limit the invention in any way, but are provided for the sake of clarity.

The system 20 according to an embodiment of the present invention may also include a central server, and a sensor in communication with the central server 34 to sense a level of wastewater within the wet well 30. The pump 32 may be moved to an on position when the level of the wastewater within the wet well 30 is at or above a first level 40. The level of the wastewater within the wet well 30 may be systematically manipulated responsive to the central server 34 to control the fluid flow in the wastewater treatment system 22. More specifically, and as perhaps best illustrated in FIG. 14, upon detection that the level of the wastewater within the wet well 30 is at or above the first level 40, the pump 32 may be moved to an on position to lower the level of the wastewater. It is preferable that the level of the wastewater within the wet well 30 is lowered to an elevation below the first level 40 before the pump 32 is moved to the off position. Those skilled in the art, however, will appreciate that the level of the wastewater within the wet well 30 that is used to determine when the pump 32 is moved to the off position may be manipulated. As will be discussed in greater detail below, the level of the wastewater in the wet well 30 at which the pump 32 may move to the off position may be manipulated in many different ways.

The system 20 according to an embodiment of the present invention may include a transceiver 38 that is positioned in communication with the central server 34. The system 20 may also include a sensor 44 to transmit information related to the level of the wastewater within the wet well 30 to the central server 34. Perhaps best illustrated in FIG. 14, the sensor 44 and the transceiver 38 may be communicatively connected to one another. The transceiver 38 may, for example, be a radio device that emits a radio frequency (RF) signal or any other type of signal suitable for transmitting data. The data that may be transmitted by the transceiver 38 may relate to information sensed by the sensor 44 which may, for example, be related to a level of wastewater or other fluid within the wet well 30. The transceiver 38 is in communication with the central server 34 and may receive information from the central server to systematically manipulate the level of wastewater within the wet well 30. Systematically manipulating the level of wastewater within the wet well 30 advantageously allows for the pumps 32 within the wet well to be systematically operated to thereby control the management of fluid within the wastewater treatment system 22.

It is contemplated that the wet wells 30 in the wastewater treatment system 22 may be communicatively connected to one another using the transceivers 38. For example, data associated with one wet well 30 may be transmitted using the transceiver 38 at that wet well to another wet well, or data may be exchanged between wet wells using the transceivers at each wet well. For example, and with reference to FIG. 13, the transceiver 38 at one of the wet wells 30 may transmit a message that contains information so that all of the wet wells may receive that information. The wet wells 30 that receive the information can analyze the information to determine whether or not that information is intended for the wet well at which it is received. If it is not intended for the wet well at which it is received, then the information can be passed along, or otherwise transmitted until the information reaches its appropriate destination. Additional information relating to this type of information transfer system is disclosed in U.S. Provisional Patent Application No. 61/468, 924, which includes the inventor of the present invention and was filed on Mar. 29, 2011, entitled "Modbus Simulation System and Associated Transfer Methods," the entire contents of which are incorporated herein by reference.

This disclosure is intended to detail several different ways in which the flow of fluid throughout the wastewater treatment system 22 is managed. Three specific techniques that are used to manage fluid flow within a wastewater treatment system 22 using the system 20 according to an embodiment of the present invention are pump management, flow management and time domain management. Time domain management can be considered a subset of flow management, i.e., time domain flow management, but for clarity, the time domain management technique will be described as a separate technique all together. Discussion regarding the pump management technique follows below. The pump management technique can be described as a minute-by-minute management of pumps 32 within the wet wells 30 of each of the pump stations 28 of the wastewater treatment system 22. Such a management system centralizes operation of the pumps 32 within the wet wells 30. Current systems allow for pump stations 28 to operate independently of one another. This can cause pressure in the force main 26 to be elevated, and can also overwork a wastewater treatment system 22. The system 20 according to an embodiment of the present invention centralizes management of the pumps 32 in the wet wells 30 to advantageously manage flow of wastewater within the wastewater treatment system 22 so as to minimize overworking a wastewater treatment system, to decrease energy usage, and to more efficiently manage the flow of wastewater within the wastewater treatment system. Pump management, according to the system 20 of an embodiment of the present invention, may also advantageously be used to prioritize which pumps 32 (pump stations/wet wells) are set to pump, which can be based on any number of factors.

The central server 34 may receive information relating to a number of pumps 32 that are operating in the on position at any given time. The pumps 32 in the wet wells 30 may be operated in the on position based on the total number of pumps that are operating in the on position at the given time throughout the entire wastewater treatment system 22. In other words, and meant only for exemplary purposes, twelve pump stations are illustrated in FIG. 13. The central server 34 may receive information from each of the pump stations 28 indicating whether or not the pumps 32 at the pump stations are operating in the on position. The central server 34 may thereafter determine a certain number of the pumps that are to be operated in the on position based on the total number of pumps that are operating. With respect to the example illustrated in FIG. 13, the central server 34 may, for example, receive information indicating that seven of the twelve pump stations 28 have pumps 32 that are operating in the on position. In an effort to decrease the flow of wastewater throughout the force main 26, the central server 34 may, for example, send a signal to each of the pump stations 28 using the transceivers 38 to turn off three of the seven pumps that are operating. A determination of which three pumps 32 to turn to the off position may be made in any number of ways, e.g., based on priority, capacity, location, etc. Alternatively, the central server may determine that not enough wastewater is flowing through the force main 26 of the wastewater treatment system 22 and may, for example, instruct the remaining pumps 32 to be turned to the on position. Again, the above is meant merely for exemplary purposes, and not meant to limit the invention in any way, and should not be read to limit the claims in any way.

There are several ways in which the pump 32 may be turned between the on position and the off position. Generally, the pump 32 within the wet well 30 is turned to the on position based on the level of wastewater within the wet well. More specifically, the pump 32 may be turned to the on position when the level of the wastewater within the wet well 30 is at or above a first level 40 within the wet well. The system 20 according to an embodiment of the present invention may systematically manipulate the first level 40 so that the pump 32 may be moved between the on position and an off position depending on the number of pumps that are operating in the on position at the given time. More specifically, in order to manipulate the level of the wastewater within the wet well 30 at which the pump 32 is moved to the on position, the first level 40 may be manipulated. This manipulation may occur when the central server 34 sends a signal to the transceiver 38 to either raise or lower the first level 40 at which the pump 32 is moved to the on position. For example, if it is desirous for the flow within the force main 26 of the wastewater treatment system 22 to be increased, the first level 40 within the wet well 30 may be lowered by sending a signal from the central server 34 to the transceiver 38 at the pump station 28 to lower the first level. Accordingly, when the level of the wastewater within the wet well 30 reaches or exceeds the elevation of the first level 40, the pump 32 within the wet well will be moved to the on position.

Although the system 20 according to an embodiment of the present invention contemplates that it is possible for the central server 34 to send a signal to the pump stations 28 using the transceiver 38 to move the pumps 32 between the on position and the off position, it is preferable that the central server manipulates the first level 40 (which is the sensed level of wastewater within the wet well 30 at which the pump 32 is moved to the on position). This technique is preferable for several reasons. By moving the pumps 32 between the on position and the off position based on the first level 40, and by ensuring that the first level is always above an elevation of the pump, the system 20 according to an embodiment of the present invention is sure that the pump 32 will never run dry, i.e., that the pump will never be moved to the on position when it is not submerged.

When operating the system 20 according to an embodiment of the present invention, and when using a pump management technique of the system, a limited number of pumps 32 may be operated in the on position at a given time. The limited number of pumps 32 that are operated in the on position at the given time may be prioritized based on several different factors. For example, one of the factors that may determine the priority of when a pump 32 in the wet well 30 is operated in the on position may be the level of the wastewater within the wet well. For example, a wet well 30 having a higher level of wastewater may receive a signal that results in the pump 32 being operated in the on position, as opposed to a wet well having a lower level of wastewater therein. Again, it is preferred that the signal that is sent from the central server 34 to the pump station 28 is a signal that manipulates the first level 40 so that the first level is at an elevation that would necessitate the pump 32 to be moved to the on position, i.e., is at a level that is below an elevation of the wastewater in the wet well 30.

The priority of operation of the pump 32 within the wet well 30 may also be based on a proximity of the wet well to the wastewater treatment plant 24. This may be desirous to manage the flow within the force main 26 of the wastewater treatment system 22. For example, operating the pumps 32 in the wet wells 30 that are closer in proximity to the wastewater treatment plant 24 decreases the burden of flow of the wastewater on the wastewater treatment system by removing a compounding affect. For example, if the pumps 32 in the wet wells 30 that are located further in proximity from the wastewater treatment plant 24 are operated first, then the flow of wastewater from those wet wells collects in closer proximity wet wells, thereby increasing flow of wastewater in the force main 26 as it gets closer to the wastewater treatment plant 24. Increased flow may be more difficult to manage, and may put unneeded stress on the wastewater treatment system 22. Accordingly, operating the pumps 32 and the wet wells 30 based on proximity to the wastewater treatment plant 24 can advantageously provide for enhanced flow management of the wastewater within the wastewater treatment system 22.

Figure 15:
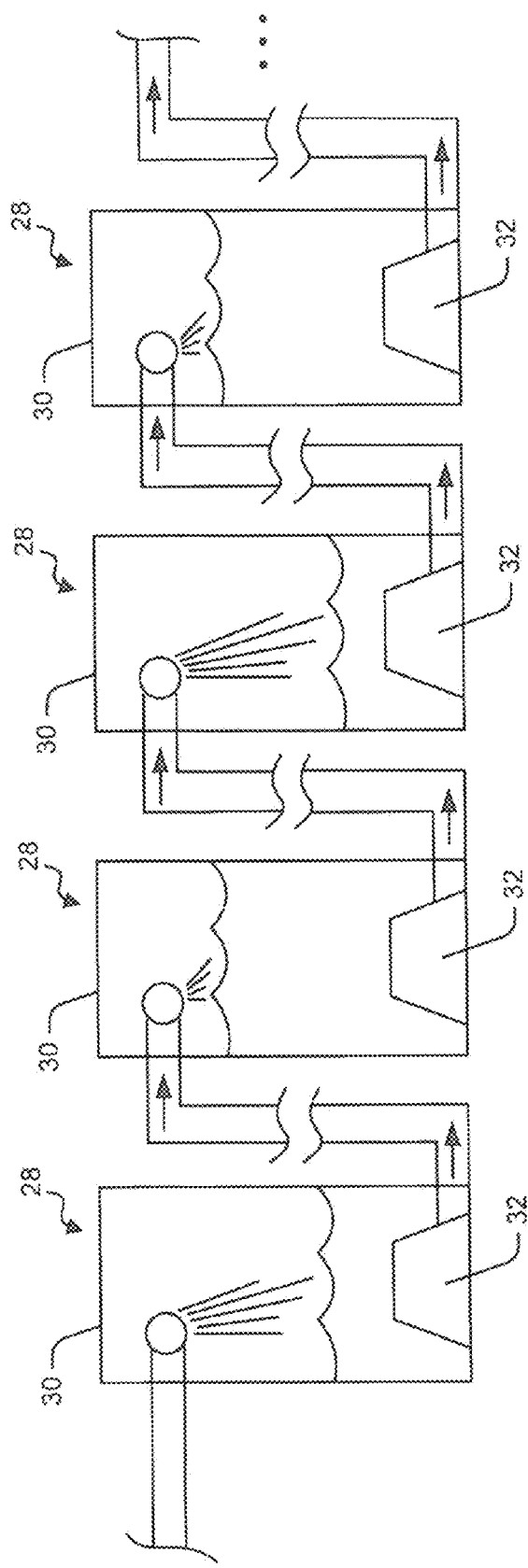
FIG. 15 is schematic diagram showing a plurality of wet wells to control fluid flow in a wastewater treatment system that are in communication with one another according to an embodiment of the present invention.

This can be viewed by the example illustrated in FIG. 15. More specifically, a series of pump stations 28 may be communicatively connected to one another. The fluid from the wet well 30 of one pump station 28 may be moved downstream until it finally reaches the wastewater treatment plant 24. As it is being moved downstream, the flow is deposited into additional wet wells along the way. By operating the pumps 32 in the wet wells in an order from furthest in proximity to closest in proximity, the flow burden may be increased. Accordingly, prioritizing pumping of the fluid within the wet wells 30 by proximity advantageously enhances management of the wastewater within the wastewater treatment system.

Figure 14:
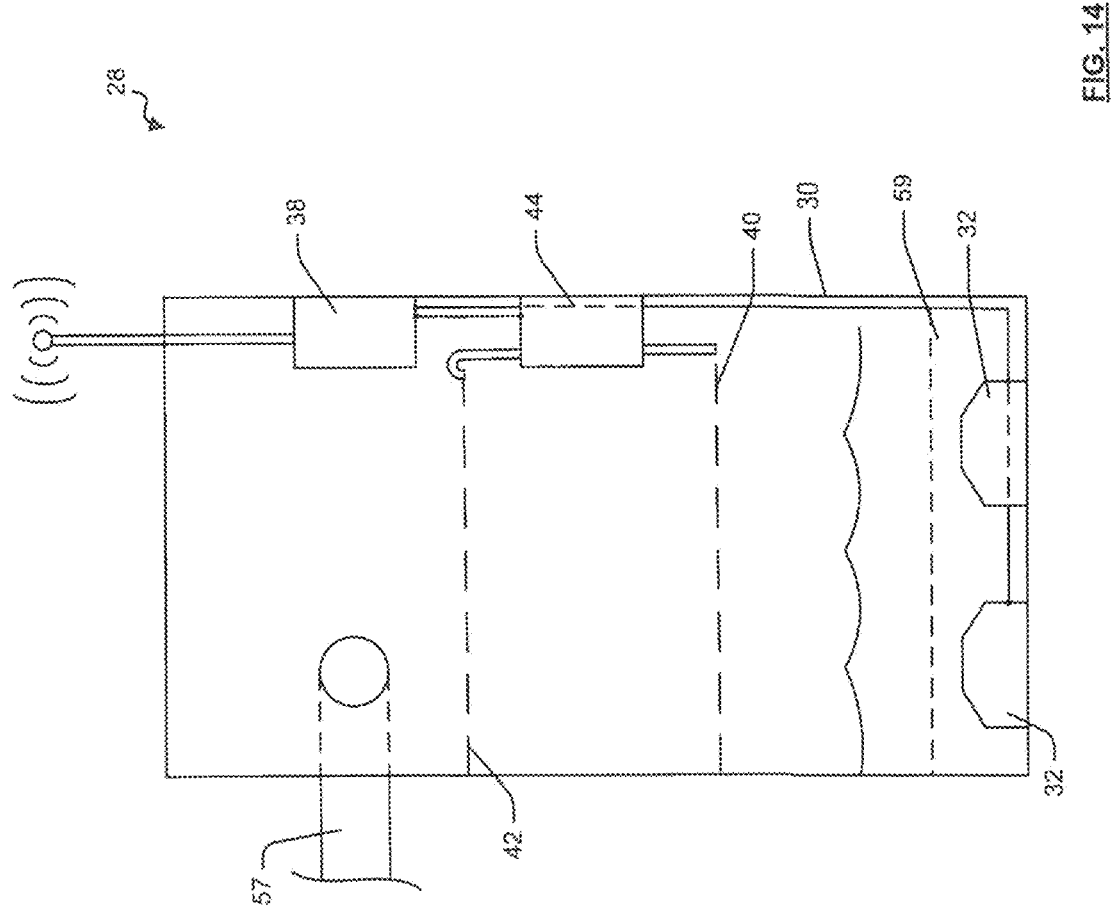
FIG. 14 is a schematic block diagram of a wet well of a system to control fluid flow according to an embodiment of the present invention.

As perhaps best illustrated in FIG. 14, each of the wet wells 30 may include a pair of pumps 32. As indicated above, however, the wet wells 30 may include any number of pumps 32 suitable to pump fluid contained within the wet well to the wastewater treatment plant 24. For exemplary purposes, however, the illustration of the pump station 28 shown in FIG. 14 includes two pumps 32 positioned within the wet well 30. Both of the pumps 32 are in communication with the sensor 36 and the transceiver 38. A first one of the pumps 32 may be moved to the on position when the wastewater level in the wet well 30 is sensed to be at or above the first level 40. Both pumps 32 may be operated in the on position when the wastewater level within the wet well 30 is sensed to be at or above a second level 42. The second level 42 is preferably positioned at or below a level of the input 57 into the wet well 30.

The use of multiple pumps 32 decreases the chance of overflow of the wet well 30. For example, the second pump 32 can be used as a "emergency pump." The second pump would only be operated in the on position when the level of the wastewater within the wet well 30 rises above the second level 42, thereby indicating that the wastewater being deposited into the wet well cannot be adequately pumped out using only one pump. Therefore, the pair of pumps 32 may be operated to more effectively pump the wastewater out of the wet well 30 and to the wastewater treatment plant 24. By positioning the second level 42 adjacent to or below the input 57 of the wet well 30, the pumps 32 are more ready to pump down the level of the wastewater within the wet well prior to an overflow occurring. Additionally, the second pump can be considered as a backup pump in a case where the first pump fails. This is yet another advantageous feature of the system 20 according to an embodiment of the present invention.

As indicated above, a first level 40 that is set by receiving a signal from the central server 34 may be manipulated to control the fluid flow within the wastewater treatment system. Similarly, the second level 42 may be manipulated for multiple purposes. For example, the second level 42 may be manipulated to ensure that wastewater within the wet well 30 does not overflow. Alternately, the system 20 according to an embodiment of the present invention contemplates that the second level 42 may be manipulated to better manage the flow of wastewater within the wastewater treatment system 22.

Another aspect of the system 20 according to an embodiment of the present invention is directed to flow management within the wastewater treatment system 22. In other words, as opposed to managing operation of the pumps to control flow, the flow of wastewater within the wastewater treatment system 22 may be actively monitored and pumps 32 in the wet wells 30 of the pump stations 28 of the wastewater treatment system 22 may be systematically moved between the on position and the off position in response to the sensed flow rate of wastewater within the wastewater treatment system. Accordingly, the system 20 according to an embodiment of the present invention may include a flow meter 58 carried by the main 26 adjacent the wastewater treatment plant 24 and in communication with the central server 34. The flow meter 58 may sense a flow rate of wastewater into the wastewater treatment plant 24, and the central server 34 may transmit a signal to the transceiver 38 to move the pump 32 in a number of the wet wells 30 to the on position responsive to the sensed flow rate of the wastewater into the wastewater treatment plant 24. For example, upon sensing a flow rate that may be above a threshold level, the central server 34 may transmit a signal using the transceiver 38 to some of the pump stations 28 to move pumps 32 within the wet wells 30 from an on position to an off position to decrease the flow of wastewater into the wastewater treatment plant 24, i.e., to keep some of the wastewater in the wastewater treatment system 22 in the field. This advantageously allows for the wastewater treatment system 22 to not be overburdened. As an alternate example, if the sensed flow rate is below a particular level, the system 20 according to an embodiment of the present invention may cause the central server 34 to transmit a signal to the pump stations 28 to move some of the pumps 32 in the wet wells 30 from an off position to an on position to increase the flow of wastewater into the wastewater treatment plant 24. This advantageously allows for the wastewater treatment system 22 to be efficiently used and eases the burden that may occur during peak flow ties. The system 20 according to an embodiment of the present invention also contemplates that multiple flow meters 58 may be used throughout the wastewater treatment system 22 to monitor flow within the main 26. For example, a plurality of flow meters 58 may be communicatively connected to a respective plurality of pump stations 28 to monitor the flow of wastewater into and out of the individual pump stations. Data collected from the flow meters 58 may be used to determine which pumps 32 should be turned on and which pumps should be turned off.

Another aspect of this flow management technique includes calculating, or determining, an average flow rate of wastewater in the wastewater treatment system 22. Referring, for example, to FIG. 17A, peak times may be calculated and may be defined as time periods when the flow rate of wastewater in the wastewater treatment system 22 is above the average flow rate. The pumps 32 in the wet wells 30 of the pump stations 28 may operate in the on position prior to the peak time period to lower the level of the wastewater within the wet well. The pumps 32 may be moved to an off position when the level of the wastewater in the wet wells 30 is at or below a pump cutoff level 59. The pump cutoff level 59 is a level within the wet well 30 that is below the first level 40, but above the elevation of each of the pumps 32 within the wet well. More particularly, and to ensure that the pumps 32 within the wet well 30 do not run dry, i.e., are not in the on position while submerged, the pump cutoff level 59 is preferably positioned above the pumps so that the pumps within the wet well are moved to the off position while the pumps are still submerged. This may, for example, be considered a failsafe within the system 20 according to an embodiment of the present invention to ensure that the pumps 32 within the wet well 30 do not malfunction or fail because they have been run while not being submerged.

As perhaps best illustrated in the graph of FIG. 17B, when the pumps 32 are moved to the on position for a period of time prior to the peak time period and for a period of time after the peak time period, the peaks and valleys representing the flow of wastewater within the wastewater treatment system 22 are leveled out. In order to be sure that the flow of wastewater within the wastewater treatment system 22 is more appropriately managed using a flow management technique, the first level 40 within the wet well 30 may be raised during the peak time period to allow for the level of wastewater within the wet well 30 to rise before being pumped to the wastewater treatment plant 24. Similarly, in order to also reduce the flow of wastewater during the peak time period, the first level 40 in the wet well 30 may be lowered prior to the peak time period so that the pumps 32 operate in the on position prior to the peak time period. This advantageously lowers the levels of wastewater within the wet wells 30 so that the wet wells have more capacity during the peak time period. This, in turn, allows for more wastewater to be stored in the field, instead of necessitating the movement of a high volume of wastewater to the wastewater treatment plant 24 during the peak time period. After the peak time period, the wet wells 30 can be systematically drained so that the peak flow that occurs during the peak time period is spread out over a longer time period. Spreading the peak flow that occurs during the peak time period over a larger period of time advantageously decreases the amount of wastewater that must be treated by the wastewater treatment plant 24 during the peak time periods which, in turn, decreases the burden placed on the entire wastewater treatment system 22. This advantageously enhances the life of a wastewater treatment system 22 including, but not limited to, the pipes, the force main 26, the pumps 32, and the wastewater treatment plant 24. Another additional advantage is that management of the flow rate into the wastewater treatment plant 24 advantageously enhances the effectiveness of the wastewater treatment plant and reduces the need to expand a wastewater treatment plant simply to accommodate peak flow periods.

Using the flow management technique, the pumps 32 may operate in the on position for a period of time before the peak time period and for a period of time after the peak time period. The period of time before the peak time period and the period of time after the peak time period have a collective length sufficient to lower the flow rate of the wastewater within the wastewater treatment system 22 during the peak time period to a flow rate that is about equal to or less than the average flow rate. As perhaps best illustrated in FIG. 17B, however, the flow management technique may simply decrease the peak flow rates, or spread the peak flow rates over a larger amount of time so that the peaks are not as far above the average flow rate.

Another management technique that is used to control flow within the wastewater treatment system 22 may, for example, be considered a time domain management technique. Using such a technique, the pumps 32 in the wet wells 30 of the pump stations 28 may be systematically moved to the on position at a certain time for a certain period of time. This may be performed responsive to a signal from the central server 34. Further, the present invention contemplates that the central server 34 may include a clock as associated with each of the wet wells 30, and that the central server may transmit a signal to move the pumps 32 in the wet wells 30 from an off position to an on position at a certain time. A fixed number of pumps 32 may be moved to the on position for a certain period of time. Those skilled in the art will appreciate that the failsafe will remain in effect so that the pumps 32 do not run dry. More specifically, even though a pump 32 may be operating in the on position pursuant to the assigned time period, if the level of wastewater within the wet well 30 is at or below the pump cutoff level 59, the pumps may be automatically moved to the off position.

The system 20 according to an embodiment of the present invention may be operational in a scouring mode. More specifically, when the system 20 operates in the scouring mode, substantially all of the pumps 32 in the system may be moved to an off position to define a pre-scouring time period. Thereafter, substantially all of the pumps 32 may be moved to the on position to define a scouring time period. The scouring mode advantageously allows for the main 26 within the wastewater treatment system 22 to be "flushed." More specifically, in some instances, during routine operation of a wastewater treatment system 22, solids may settle out of the wastewater and may collect on the bottom of the pipes of the main 26. As the solids collect on the bottom of the main 26, flow within the wastewater treatment system 22 may be obstructed. The scouring mode advantageously flushes the settled solids and moves the settled solids in the flow of the wastewater to the wastewater treatment plant 24 for additional treatment. Those skilled in the art will appreciate that the scouring mode may occur based on time intervals, or the system 20 may operate in the scouring mode based on a sensed condition within the main. For example, a sensor may be positioned within the main 26 to detect solids settled in the bottom of the pipe of the main. Upon sensing the solids in the pipes of the main 26, the system 20 may activate the scouring mode so that the solids may be removed.

The wastewater treatment plant 24 may include a wastewater basin 56 to receive wastewater overflow. The wastewater basin 56 may, for example, be a man-made structure adjacent the wastewater treatment plant 24 to hold wastewater that cannot be treated by the wastewater treatment plant due to capacity restrictions. The wastewater basin 56 may, for example, be provided by an excavated area that is preferably covered, or by a plurality of storage tanks. The wastewater basin 56 may include a level sensor 55 that is in communication with the central server 34 to sense the level of wastewater within the wastewater basin. The level of wastewater within the wet wells 30 may be systematically manipulated responsive to the level sensor 55 in the wastewater basin 56. More specifically, the pumps 32 in the wet wells 30 may be moved between the on position and the off position depending on the level of the wastewater in the wastewater basin 56. For example, if the level of the wastewater in the wastewater basin 56 is above the threshold level, the central server 34 may transmit a signal to each of the pump stations 28 using the transceivers 38 to move the pumps 32 in the wet wells 30 to the off position so that wastewater is stored in the wet wells while the wastewater treatment plant 24 treats the wastewater and frees up capacity in the wastewater basin. In other words, the central server 34 may direct that untreated wastewater remain in the field (in the wet wells 30 of the pump stations 28) while the wastewater treatment plant 24 treats the wastewater stored in the wastewater basin 56. This aspect of the system 20 according to an embodiment of the present invention advantageously decreases the possibility of an overflow of wastewater occurring at the wastewater treatment plant 24 should the wastewater treatment plant not have the capacity to keep up with the demand. By keeping some of the wastewater in the field, the system 20 according to an embodiment of the present invention advantageously decreases the burden of peak flows on the wastewater treatment system 22, lengthens the life of the wastewater treatment system, efficiently manages the flow of wastewater in the wastewater treatment system, and effectively increases the capacity of the wastewater treatment system, thereby decreasing a need for expansion of the wastewater treatment system.

Referring now to FIG. 16, a communication aspect of the system 20 according to an embodiment of the present invention is now described in greater detail. The central server 34 may include a CPU 48, a network adapter 50, and a memory 52. The central server 34 may be positioned in communication with a network 46, and the transceivers 38 at each of the pump stations 28 may also be positioned in communication with the network. The network 46 may, for example, be a global communications network such as the Internet, or any other type of network as understood by those skilled in the art. Those skilled in the art will appreciate that this communication system advantageously allows for each of the wet wells 30 of each of the pump stations 28 to be remotely monitored from any location. More specifically, it is contemplated that the user may connect to the central server 34 through the network 46, and preferably using a secure connection, such as a virtual private network (VPN), or other secure connections as understood by those skilled in the art.

Figure 18:
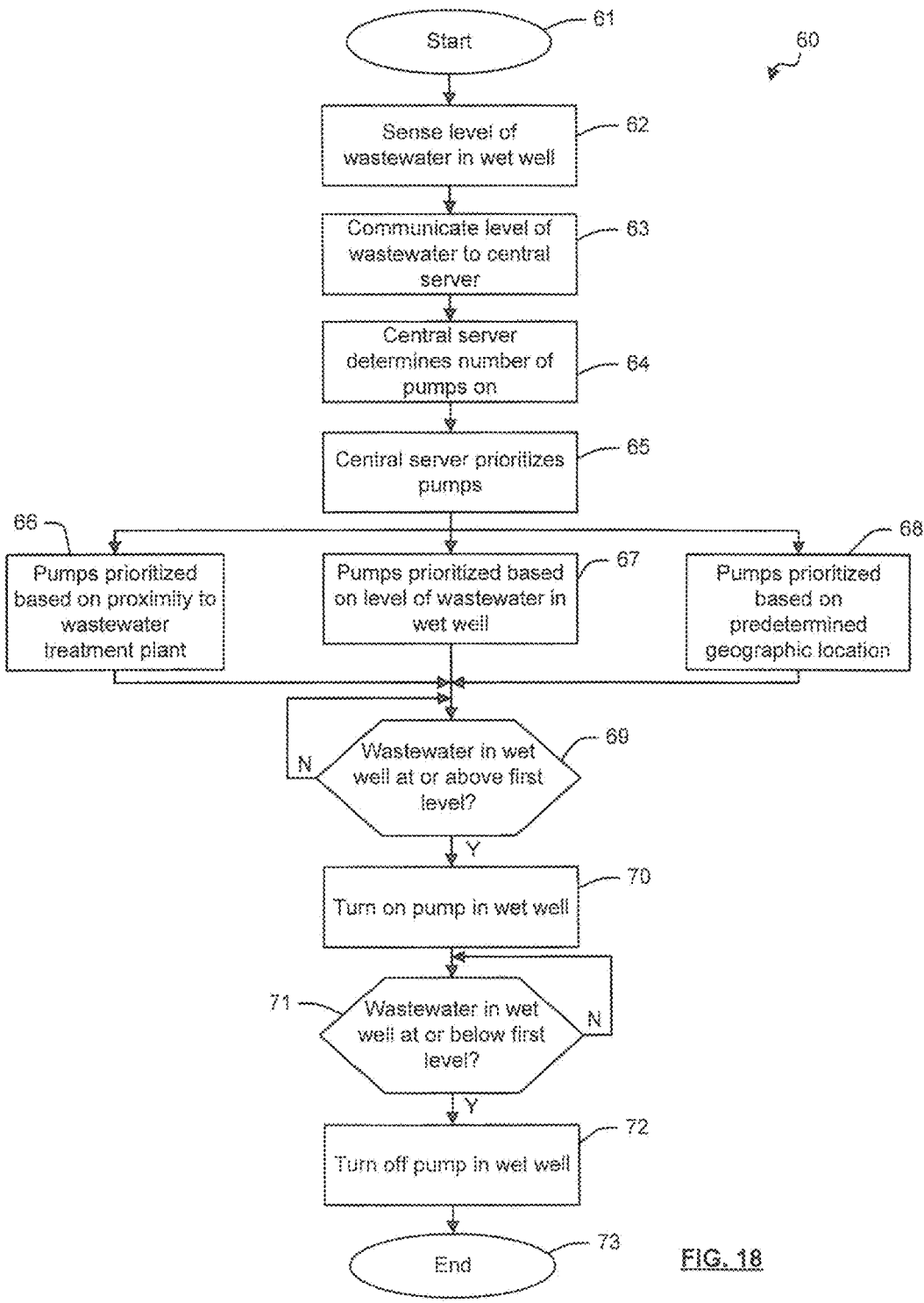
FIGS. 18-25 are flow charts illustrating embodiments of method aspects of the present invention.

Referring now additionally to the Flowchart 60 of FIG. 18, a method aspect of the present invention, will now be described in greater detail. From the start (Block 61), the level of wastewater in the wet well is sensed at block 62. At Block 63, the level of the wastewater in the wet well is communicated to the central server. The central server may then determine the number of pumps that are in the on position at Block 64. At Block 65, the central server may prioritize the pumps. The pumps may be prioritized in any number of ways. For example, the pumps may be prioritized based on their proximity to the wastewater treatment plant (Block 66), based on the level of wastewater in the wet well (Block 67), or based on a predetermined geographical location (Block 68). Meant for exemplary purposes only, when prioritizing the pumps based on the predetermined geographical location, particular geographical locations may be identified that are prioritized over other geographical locations, and may be programmed into the system. For example, certain neighborhoods may be prioritized over other areas based on density, or geographical locations dealing with health and welfare, e.g., hospitals, may be prioritized over other geographical locations.

At Block 69, it is determined whether the wastewater in the wet well is at or above a first level. If it is determined at Block 69 that the wastewater in the wet well is at or above the first level, then the pump in that wet well is moved to the on position at Block 70. If, however, it is determined that the wastewater in the wet well is not at or above the first level, then the system awaits for the level of the wastewater in the wet well to be at or above the first level. At Block 71, it is determined whether or not the wastewater in the wet well is at or below the first level. If it is determined at Block 71 that the wastewater in the wet well is not at or below the first level, then the pump remains on at Block 70 until the wastewater in the wet well is at or below the first level. Accordingly, upon determining that the wastewater in the wet well is at or below the first level, the pump is turned off at Block 72, and the method is ended at Block 73.

Figure 19:
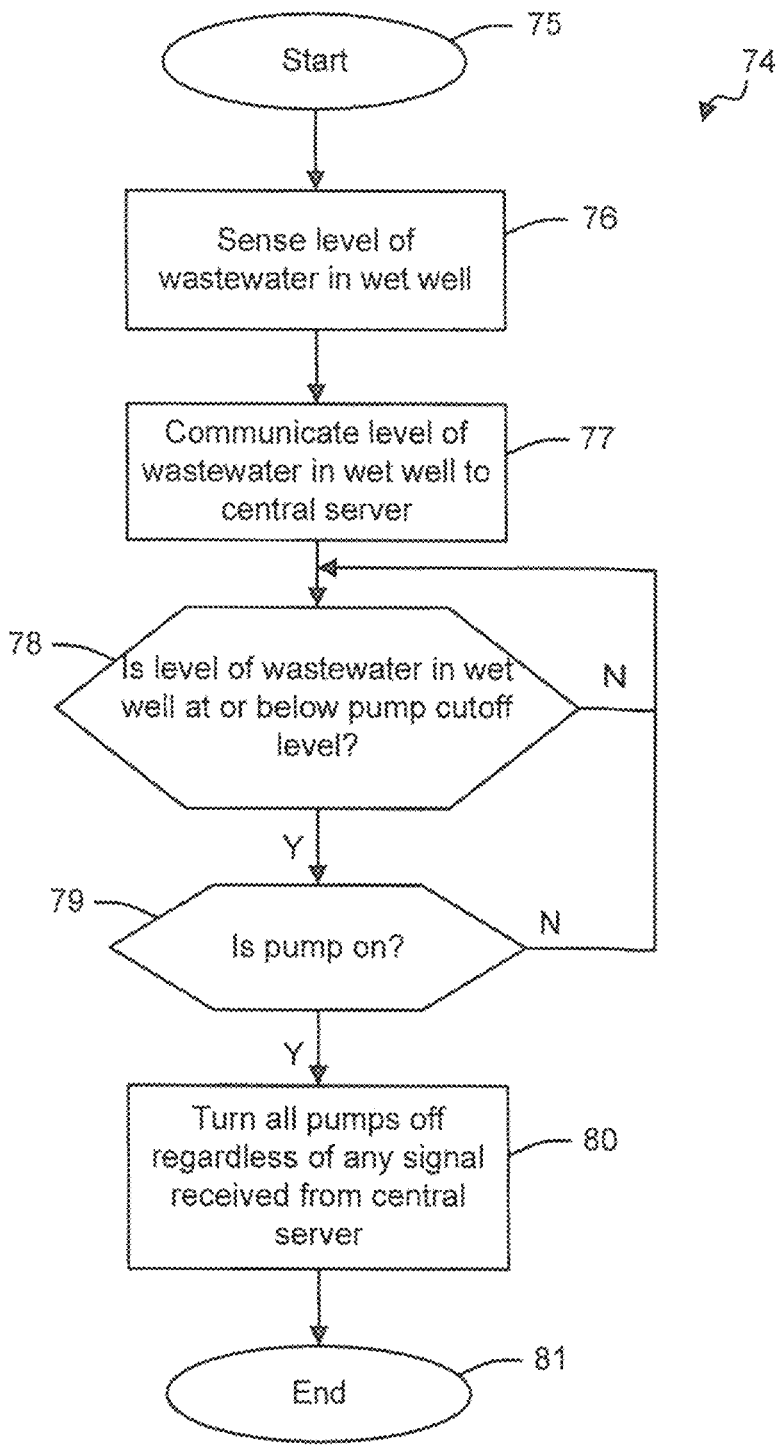

Referring now additionally to the Flowchart 74 illustrated in FIG. 19, another method aspect according to an embodiment of the present invention, is now discussed in greater detail. More specifically, the Flowchart 74 illustrated in FIG. 19 is directed to a failsafe that is built into operation of the system according to an embodiment of the present invention. From the start (Block 75), a level of wastewater in the wet well is sensed at Block 76, and is communicated to the central server at Block 77. At Block 78, it is determined whether or not the level of the wastewater in the wet well is at or below a pump cut-off level. If it is determined at Block 78 that the level of the wastewater is not at or below the pump cut-off level, then normal operation of the system continues. If, however, it is determined that the level of the wastewater in the wet well is at or below the pump cut-off level, then it is determined that Block 79 whether or not the pump is on. If it is determined that Block 79 that the pump is not on, then operation of the system according to an embodiment of the present invention continues. If, however, it is determined at Block 79 that the pump is on, then all pumps are turned off regardless of any signal that may have been received from the central server at Block 80. The operation ends at Block 81. This method advantageously ensures that the pumps within the wet well remain submerged during operation. Operating the pumps within the wet well when the level of the wastewater within the wet well is below the elevation of the pumps can cause damage to the pumps. Accordingly, this method aspect of an embodiment of the present invention reduces the risk of damaging the pumps by operating them dry.

Figure 20:
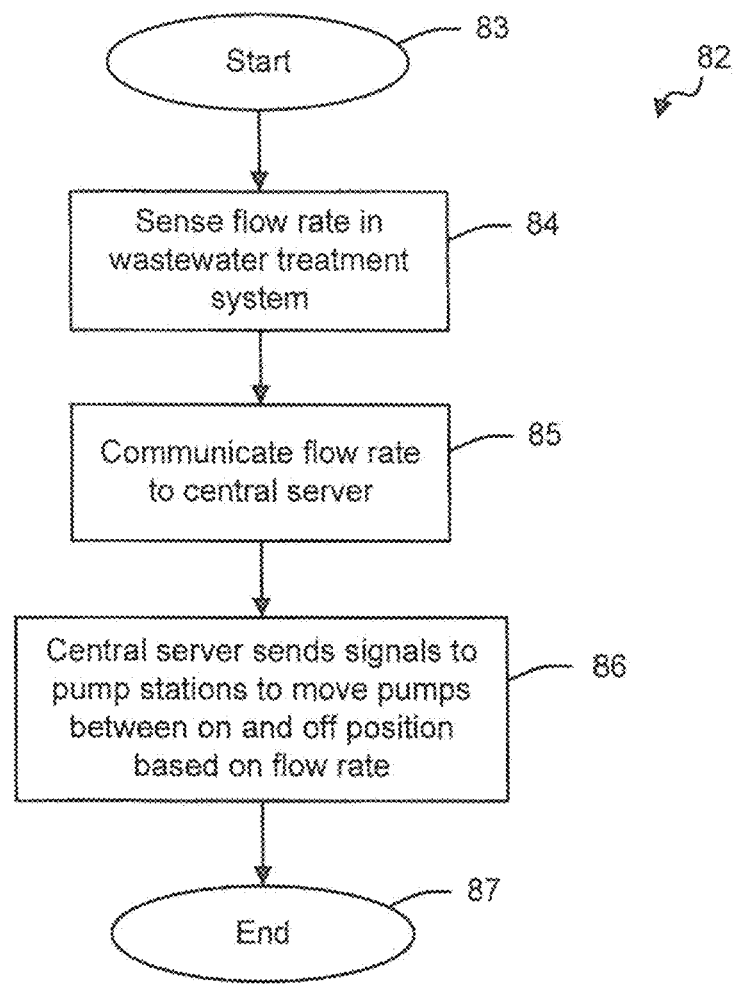

Referring to the Flowchart 82 illustrated in FIG. 20, a flow management technique according to a method of the present invention is now described in greater detail. From the start (Block 83), the flow rate of wastewater in the wastewater treatment system is sensed at Block 84 and communicated to the central server at Block 85. At Block 86, the central server sends a signal to the pumps stations to move pumps between the on position and the off position based on the flow rate. The method is ended at Block 87.

Figure 21:
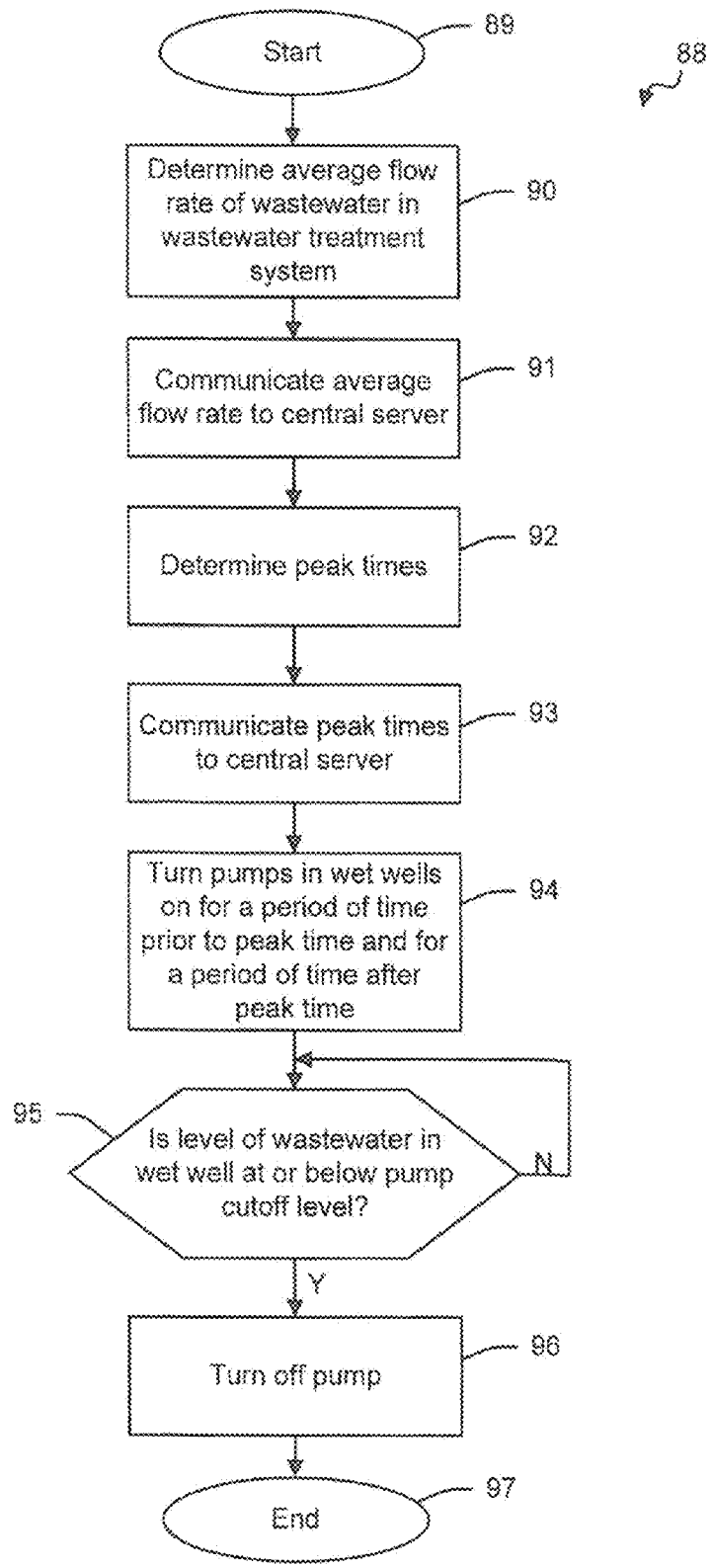

Referring now additionally to the Flowchart 88 of FIG. 21, an additional method aspect according to an embodiment of the present invention and related to a flow management technique, is now described in greater detail. From the start (Block 89), the average flow rate of wastewater in the wastewater treatment system is determined at Block 90, and communicated to the central server at Block 91. At Block 92, the peak times of flow in the wastewater treatment system are determined, and communicated to the central server at Block 93. At Block 94, the pumps in the wet wells are moved to the on position for a period of time prior to the peak time and for a period of time after the peak time. This operation advantageously spreads the peak flow rate times over a greater amount of time so that the wastewater treatment system is not burdened with a very high flow rate at any given time. Instead, the wastewater to be treated by the wastewater treatment system is spread out over a longer period of time so as to enhance efficiency of the wastewater treatment system. At Block 95, it is determined whether or not the level of the wastewater in the wet well is at or below the pump cut-off level. If the level of the wastewater in the wet well is not at or above pump cut-off level, then normal operation of the system continues. If, however, the level of the wastewater in the wet well is at or below the pump cut-off level at Block 95, then the pumps are turned off at Block 96, and the method is ended at Block 97.

Figure 22:
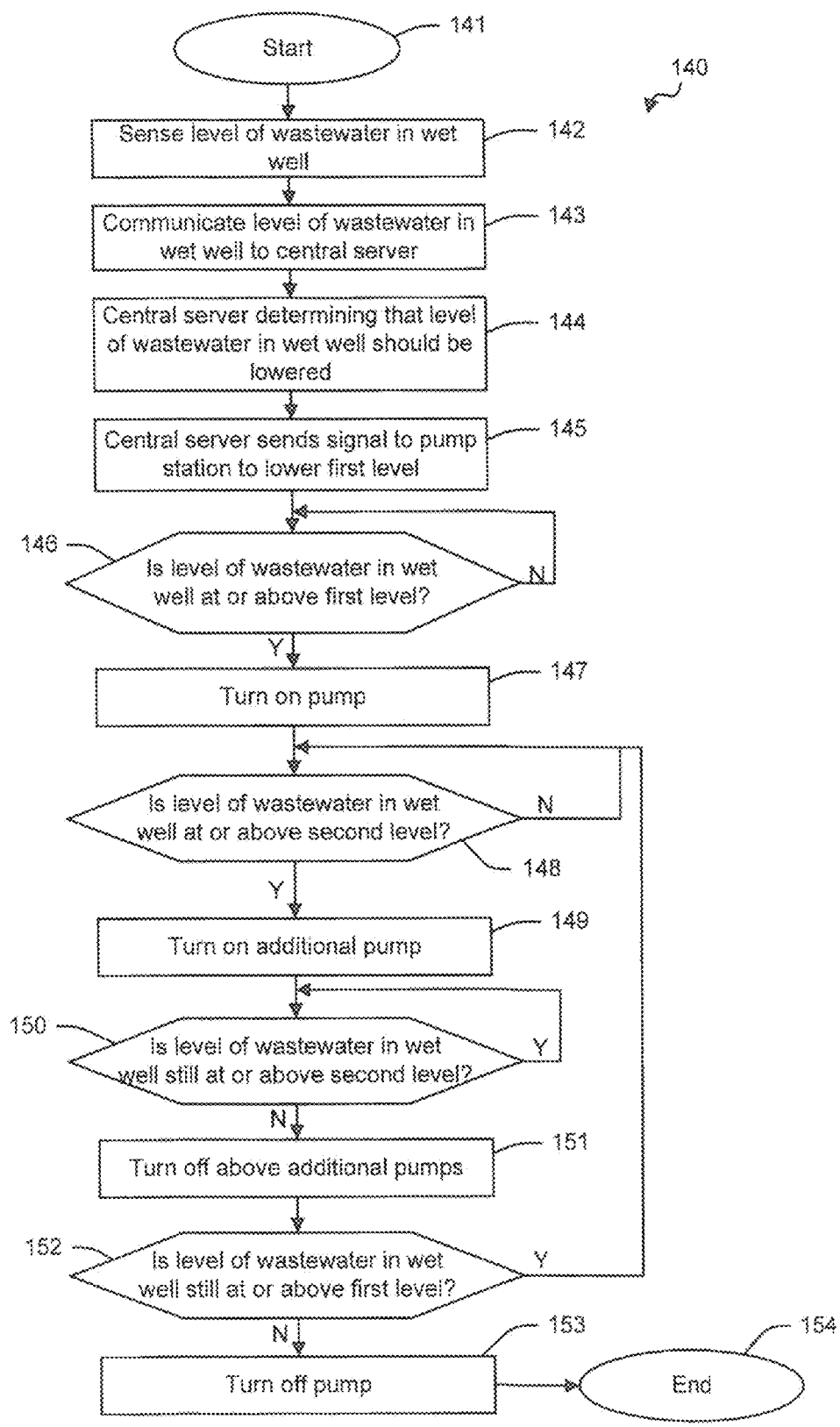

Referring now to the Flowchart 140 illustrated in FIG. 22, yet another method aspect according to an embodiment of the present invention is now described in greater detail. From the start (Block 141), the level of the wastewater in the wet well is sensed at Block 142, and is communicated to the central server at Block 143. At Block 144, a determination is made by the central server that the level of the wastewater in the wet well should be lowered. At Block 145, the central server sends a signal to the pump station to lower the first level. The first level is the level at which the pump in the wet well is moved to the on position. More specifically, if the level of the wastewater is determined to be at or above the first level (which is set by the central server) then the pump within the wet well is moved to the on position. In other words, the system and method according to an embodiment of the present invention contemplates that the central server does not necessarily send a signal to turn the pump on or off, but, instead, manipulates the first level at which the pump within the wet well is to be turned on or off.

At Block 146, it is determined whether or not the level of the wastewater in the wet well is at or above the first level. If it is determined that the level of wastewater in the wet well is at or above the first level at Block 146 then the pump is turned on at Block 147. If, however, it is determined at Block 146 that the level of the wastewater in the wet well is not at or above the first level, then normal operation of the system continues. At Block 148, it is determined whether or not the level of the wastewater in the wet well is at or above the second level. If it is determined that the wastewater in the wet well is at or above the second level at Block 148, then additional pumps are turned on at Block 149. If, however, it is determined at Block 148 that the level of wastewater in the wet well is not at or above the second level, then normal operation of the system continues. The second level is a level at which it is determined that there may be an overflow of wastewater in the wet well. Accordingly, upon reaching the second level, additional pumps may be turned on to prevent an overflow of wastewater within the wet well. It is preferably that the second level be set to a level that is below the elevation of the inlet into the wet well.

At Block 150 it is determined whether or not the level of the wastewater in the wet well is still at or above the second level. If it is determined that the level of the wastewater is still at or above the second level, then the additional pumps remain on at Block 149. If, however, it is determined at Block 150 that the level of wastewater in the wet well is not at or above the second level, then the additional pumps that were turned on at Block 149 may be turned off at Block 151. At Block 152, it is determined whether or not the level of the wastewater in the wet well is still at or above the first level. If it is determined at Block 152 that the level of wastewater in the wet well is still at or above the first level, then operation of the system continues. If, however, it is determined that the level of the wastewater in the wet well is not at or above the first level at Block 152, then the pumps are turned off at Block 153, and the method is ended at Block 154. Those skilled in the art will appreciate that although the method illustrated in the Flowchart 140 of FIG. 22 describes determining whether or not the levels in the wet well are at or above the first and second levels are separate and distinct acts, the system according to an embodiment of the present invention contemplates that the determination can be simultaneously performed, and that the pumps within the wet wells are not necessarily moved between the on and the off position one at a time, but can be simultaneously operated and simultaneously turned off.

Figure 23:
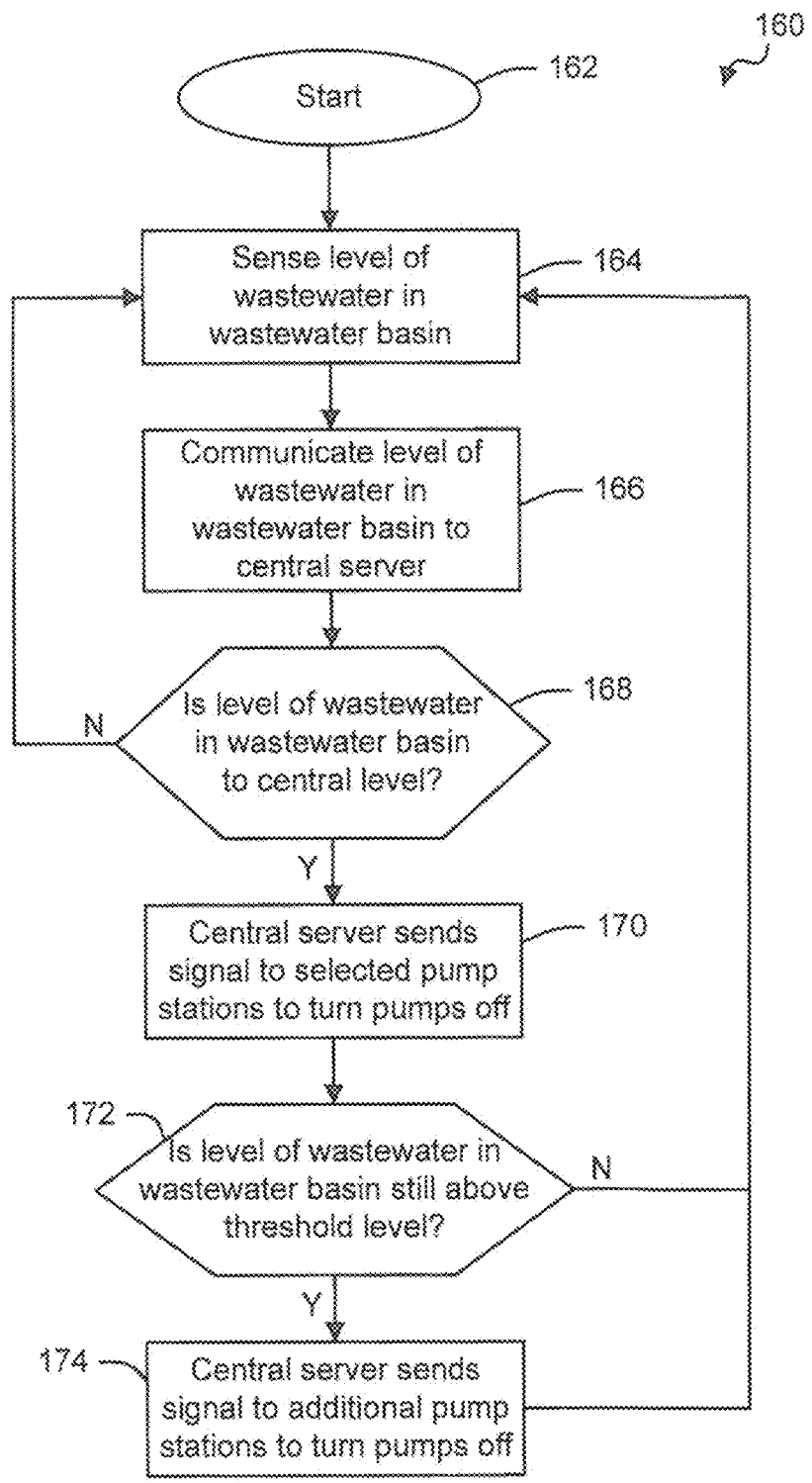

Referring now additionally to the Flowchart 160 illustrated in FIG. 23, another method aspect according to an embodiment of the present invention, is now described in greater detail. From the start (Block 162), a level of wastewater in a wastewater basin position adjacent a wastewater treatment plant is sensed at Block 164, and is communicated to the central server at Block 166. At Block 168, it is determined whether or not the level of the wastewater in the wastewater basin is above a threshold level. If it is determined that the level of the wastewater in the wastewater basin is not above the threshold level, then the operation continues to monitor the level of the wastewater in the wastewater basin at Block 164. If, however, it is determined that the level of wastewater in the wastewater basin is above the threshold level, then the central server sends a signal to selected pump stations to turn the pumps off at the selected pump stations at Block 170. This advantageously allows for the wastewater stored in the wastewater basin to be treated by the wastewater treatment plant without receiving additional wastewater from the pump stations.

At Block 172, it is determined whether or not the level of wastewater in the wastewater basin is still above the threshold level. If it is determined that the level of the wastewater in the wastewater basin is not still above the threshold level, then operation of the system continues by monitoring the level of the wastewater in the wastewater basin at Block 164. If, however, it is determined at Block 172 that the level of the wastewater in the wastewater basin is still above the threshold level, then the central server sends signals to additional pump stations to turn the pumps off at the additional pump stations. An indication that the level of the wastewater in the wastewater basin is still above the threshold level, even after the selected number of pump stations have received the signal to turn their pumps off at Block 170 is an indication that the wastewater being treated by the wastewater treatment plant is not being treated as fast as wastewater is being deposited into the wastewater basin. Accordingly, upon receiving such an indication, it is preferable to keep some of the wastewater stored in the pump stations until capacity of the wastewater treatment system, i.e., stored in the field, until the capacity of the wastewater treatment plant and the wastewater basin, have been relieved. After the central server sends the signals to the additional pump stations to turn their pumps off at Block 174, operation of the system continues by sensing the level of the wastewater in the wastewater basin at Block 164.

Figure 24:
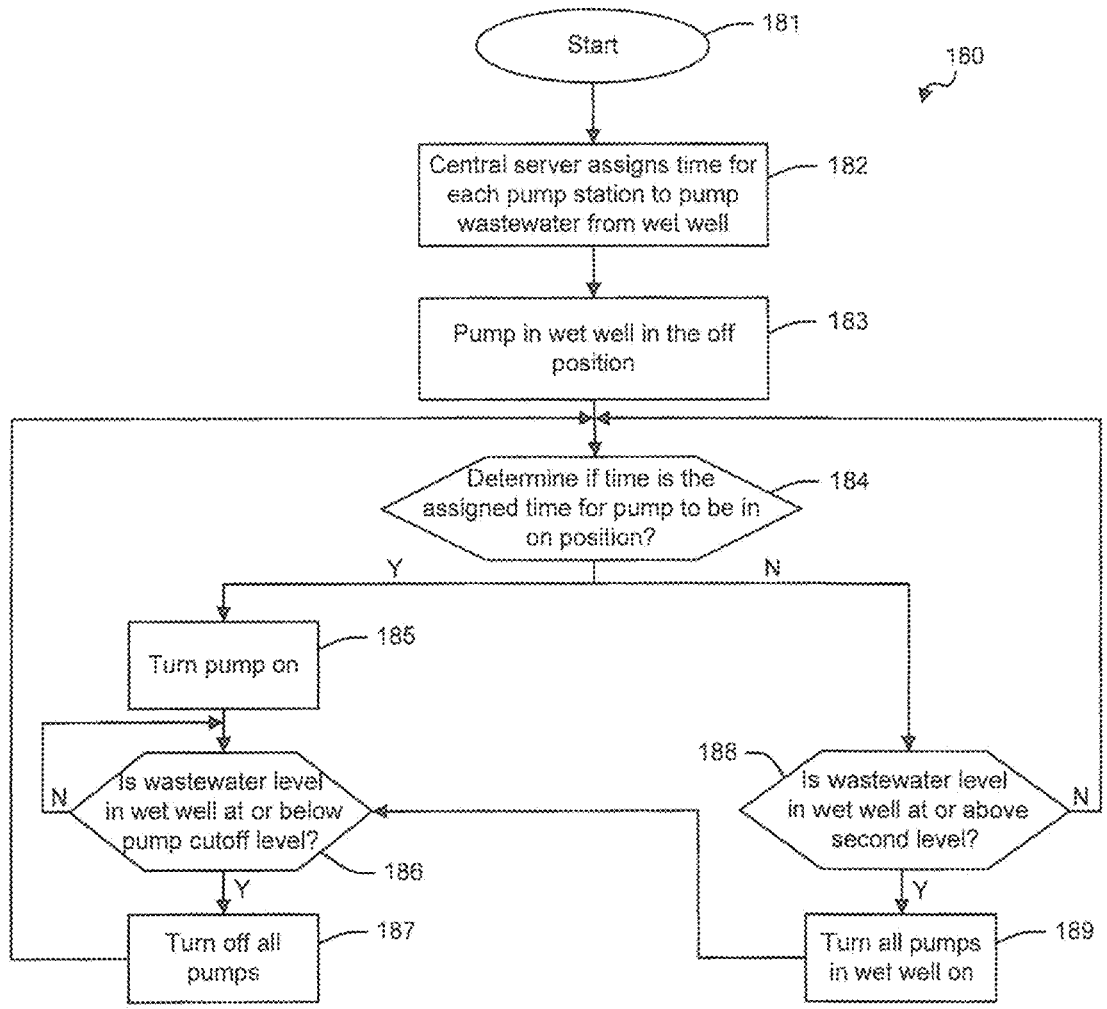

Referring now to the Flowchart 180 illustrated in FIG. 24, a time domain management technique according to a method aspect of an embodiment of the present invention is now described in greater detail. From the start (Block 181), the central server may assign a particular time for each pump station to pump wastewater from the wet well at Block 182. At Block 183, the pumps in the wet well may be positioned in the off position. At Block 184, it is determined whether or not the particular time is the assigned time for the pump in a particular pump station to be moved to the on position. In other words, after each pump station has been assigned the particular time for its pumps to pump wastewater from the wet well, each pump station goes through a check to determine whether or not the time at which the check is occurring is the same time that has been assigned for the pump to be in the on position. If it is determined at Block 184 that the particular time is the time that has been assigned by the central server for the pump to be moved to the on position, then the pump is turned on at Block 185. As indicated above, however, the signal transmitted from the central server is not necessarily a signal to turn on the pump but, instead, is a signal to lower the first level so that the first level is below the level of the wastewater within the wet well, thereby resulting in the pump being moved to the on position.

It is thereafter determined at Block 186 whether or not the wastewater level in the wet well is at or below the pump cut-off level. If it is determined that the wastewater level is not at or below the pump cut-off level at Block 186, then normal operation of the system continues. If, however, it is determined at Block 186 that the wastewater level in the wet well is at or below the pump cut-off level, then all pumps in the wet well are turned off at Block 187, and operation of the system continues at Block 184.

If it is determined at Block 184 that the particular time is not a time that is assigned for the pump in the pump station to be in the on position, then it is determined at Block 188 whether or not the wastewater level in the wet well is at or above the second level. If it is determined at Block 188 that the wastewater level in the wet well is at or above the second level then the pumps in the wet well may be moved to the on position at Block 189, and operation of the system continues at Block 186. If, however, it is determined at Block 188 that the level of the wastewater in the wet well is not at or above the second level, then normal operation of the system continues at Block 184.

Figure 25:
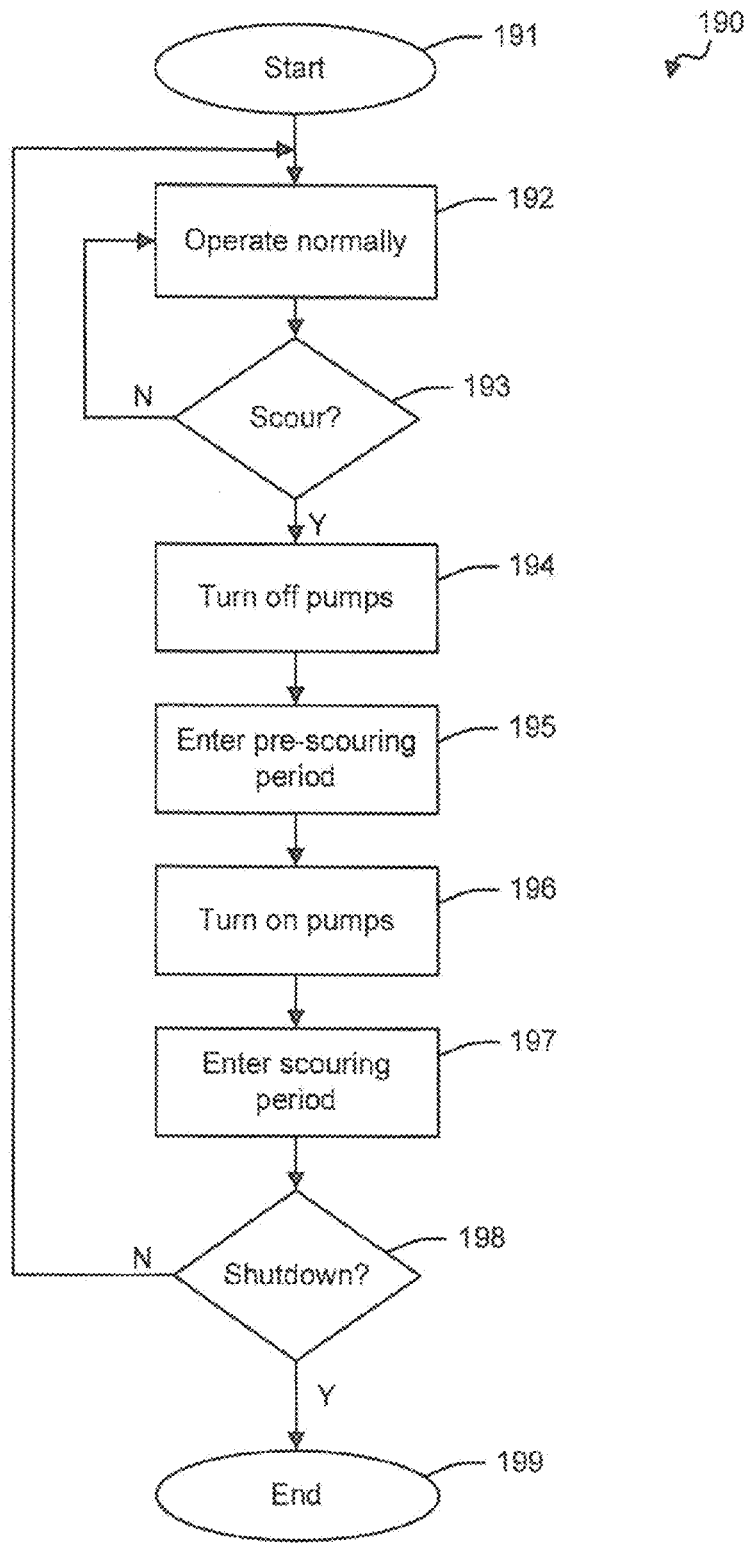

Referring now additionally to the Flowchart 190 illustrated in FIG. 25, a method aspect of operating the system in a scouring mode, according to an embodiment of the present invention, is now described in greater detail. From the start (Block 191), the system is operated normally at Block 192. At Block 193, it is determined, whether or not the system is to be operated in the scouring mode. If it is determined at Block 193 that the system is not to be operated in the scouring mode, then normal operation of the system continues at Block 192. If, however, at Block 193 it is determined that the system is to be operated in the scouring mode, then all of the pumps in the pump stations in the wastewater treatment system are moved to the off position at Block 194. At Block 195, the system enters a pre-scouring period wherein wastewater is stored in the wet wells instead of being pumped to the wastewater treatment plant. At Block 196, the pumps in the wet wells are turned on so that the system enters the scouring period at Block 197. During the scouring period, an enhanced flow of wastewater is moved through the main so that solids that have settled to the bottom of the main may be washed away and to the wastewater treatment plant for further treatment. At Block 198, it is determined whether or not a shut down command has been received. If the shut down command has been received, then the operation is terminated at Block 199. If, however, the shut down command has not been received then operation of the system continues at Block 192.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed.

That which is claimed is:

1. A system to control fluid flow in a wastewater treatment system, the wastewater treatment system comprising a wastewater treatment plant, a main connecting a plurality of pump stations to the wastewater treatment plant and carrying wastewater to the wastewater treatment plant, each of the plurality of pump stations located external to the wastewater treatment plant and including a wet well and a pump carried by the wet well, the system comprising:

a central server; and a sensor carried by each of the wet wells and in communication with the central server to sense a level of wastewater within the respective wet well;

wherein the pump in the respective wet well is automatically moved to an on position when the level of the wastewater in the respective wet well is at or above a first level;

wherein the pump in the respective wet well is automatically moved to an off position when the level of the wastewater in the respective wet well is at or below a pump cutoff level;

wherein the central server systematically manipulates the first level to selectively set the level of wastewater within the wet well;

wherein a limited number of pumps are operated in the on position at a given time;

wherein the central server prioritizes the limited number of pumps that are operated in the on position at the given time based on the level of wastewater in the wet well; and wherein the central server prioritizes the limited number of pumps that are operated in the on position at the given time based on a proximity of each pump to the wastewater treatment plant.

2. The system according to claim 1 further comprising a transceiver in communication with the central server and the sensor to transmit information relating to the level of the wastewater within the wet well to the central server; and wherein the transceiver receives information from the central server to systematically manipulate the first level to selectively set the level of wastewater within the wet well.

3. The system according to claim 2 wherein the central server receives information relating to a number of pumps that are operating in the on position at a given time; and wherein the central server systematically manipulates the first level to operate the pump in the on position based on the number of pumps that are operating in the on position at the given time.

4. The system according to claim 3 wherein the central server systematically manipulates the first level so that the pump may be moved from the off position to the on position depending on the number of pumps that are operating in the on position at the given time.

5. The system according to claim 2 further comprising a flow meter carried by the at least one main adjacent the wastewater treatment plant and in communication with the central server to sense a flow rate of wastewater into the wastewater treatment plant; and wherein the central server transmits a signal to the transceiver to manipulate the first level responsive to the sensed flow rate of wastewater into the wastewater treatment plant.

6. The system according to claim 5 wherein an average flow rate of wastewater in the wastewater system is determined; wherein a peak time period is defined as a time period when the flow rate of the wastewater in the wastewater treatment system is above the average flow rate; and wherein the central server manipulates the first level to operate the pump in the on position prior to the peak time period to lower the level of wastewater within the wet well.

7. The system according to claim 6 wherein the central server manipulates the first level to operate the pump in the on position after the peak time period to lower the level of wastewater within the wet well; and wherein the central server raises the first level during the peak period to allow for the level of wastewater within the wet well to rise before being pumped to the wastewater treatment plant.

8. The system according to claim 6 wherein the central server manipulates the first level to operate the pump in the on position for a period of time before the peak time period and for a period of time after the peak time period; and wherein the period of time before the peak time period and the period of time after the peak time period have a collective length sufficient to lower the flow rate of the wastewater within the wastewater treatment system during the peak time period to a flow rate that is equal to or less than the average flow rate.

9. The system according to claim 1 wherein the central server manipulates the first level to systematically move the pump in each of the wet wells to the on position at a certain time for a certain period of time.

10. The system according to claim 1 wherein the central server manipulates the first level to move a fixed number of pumps to the on position for a certain time period.

11. The system according to claim 1 wherein the central server operates each of the pumps in each of the wet wells in a scouring mode; and wherein the scouring mode is defined by the central server determining the level of the wastewater in each of the wet wells and by the central server manipulating the first level in each wet well in which the level of wastewater is above the pump cutoff level to move the pumps to the on position for a time period.

12. The system according to claim 1 wherein the wastewater treatment plant includes a wastewater basin to receive wastewater overflow; wherein the wastewater basin includes a level sensor that is in communication with the central server to sense a level of wastewater within the wastewater basin; and wherein the central server manipulates the first level to set the level of wastewater within the wet wells responsive to the level sensor in the wastewater basin.

13. A method to control fluid flow in a wastewater treatment system, the wastewater treatment system comprising a wastewater treatment plant, at least one main connecting a plurality of pump stations to the wastewater treatment plant and carrying wastewater to the wastewater treatment plant, each of the plurality of pump stations located external to the wastewater treatment plant and including a wet well and a pump carried by the wet well, a central server, a sensor carried by each of the wet wells and in communication with the central server, and a wastewater basin to receive wastewater overflow, the wastewater basin including a level sensor that is in communication with the central server to sense a level of wastewater within the wastewater basin, the method comprising:
  sensing a level of wastewater within the respective wet well;
  utilizing the central server to manipulate a first level;
  automatically moving the pump in the respective wet well to an on position when the level of the wastewater in the respective wet well is at or above the first level;
  automatically moving the pump in the respective wet well to an off position when the level of the wastewater in the respective wet well is at or below a pump cutoff level;
  receiving wastewater overflow in the wastewater basin;
  utilizing the level sensor to sense a level of wastewater within the wastewater basin; and
  utilizing the central server to manipulate the first level to systematically set the level of wastewater within the wet wells responsive to the level sensor in the wastewater basin.

14. The method according to claim 13 wherein the wastewater treatment system further comprises a transceiver in communication with the central server and the sensor, and wherein the method further comprises the steps of utilizing the transceiver to transmit information relating to the level of the wastewater within the wet well to the central server and utilizing the transceiver to receive information from the central server to systematically manipulate the first level.

15. The method according to claim 13 wherein the wastewater treatment system further comprises a flow meter carried by the at least one main adjacent the wastewater treatment plant and in communication with the central server to sense a flow rate of wastewater into the wastewater treatment plant; wherein the method further comprises the steps of utilizing the flow meter to sense a flow rate of wastewater into the wastewater treatment plant; and utilizing the central server to transmit a signal to manipulate the first level to systematically move the pump in a number of wet wells to the on position responsive to the sensed flow rate of wastewater into the wastewater treatment plant.

16. The method according to claim 15 further comprising utilizing the flow meter to determine an average flow rate of wastewater in the wastewater system; and wherein a peak time period is defined as a time period when the flow rate of the wastewater in the wastewater treatment system is above the average flow rate.

17. The method according to claim 16 further comprising utilizing the central server to manipulate the first level to operate the pump in the on position prior to the peak time period to lower the level of wastewater within the wet well; and utilizing the sensor to determine the level of the wastewater in the wet well.

18. The method according to claim 16 further comprising utilizing the central server to manipulate the first level to operate the pump in the on position after the peak time period to lower the level of wastewater within the wet well; and utilizing the central server to raise the first level during the peak time period to allow for the level of wastewater within the wet well to rise before being pumped to the wastewater treatment plant.

19. The method according to claim 16 further comprising utilizing the central server to manipulate the first level to operate the pump in the on position for a period of time before the peak time period and for a period of time after the peak time period; and wherein the period of time before the peak time period and the period of time after the peak time period have a collective length of time sufficient to lower the flow rate of the wastewater within the wastewater treatment system during the peak time period to a flow rate that is equal to or less than the average flow rate.

20. The method according to claim 13 further comprising utilizing the central server to manipulate the first level to systematically move the pump in each of the wet wells to the on position at a certain time for a certain period of time.

21. The method according to claim 20 further comprising utilizing the central server to manipulate the first level to move a fixed number of pumps to the on position for the certain time period.

22. The method according to claim 13 further comprising utilizing the central server to operate each of the pumps in each of the wet wells in a scouring mode; and wherein the scouring mode is defined by the central server determining the level of the wastewater in each of the wet wells and by the central server manipulating the first level in each wet well in which the level of wastewater is above the pump cutoff level to move the pumps to the on position.

* * * * *